United States Patent
Ito et al.

(10) Patent No.: US 7,626,621 B2
(45) Date of Patent: Dec. 1, 2009

(54) SOLID-STATE IMAGE PICKUP DEVICE AND OPTICAL INSTRUMENT USING THE SAME FOR ADJUSTING CURVATURES OF SOLID-STATE IMAGE PICKUP DEVICE BASED ON FOCAL LENGTH OF LENSES IN OPTICAL INSTRUMENT

(75) Inventors: Yoshihiro Ito, Saitama-ken (JP); Hiroshi Endo, Saitama-ken (JP); Akio Omiya, Saitama-ken (JP)

(73) Assignees: FUJIFILM Corporation, Tokyo (JP); Fujinon Corporation, Saitama (JP)

( * ) Notice: Subject to any disclaimer, the term of this patent is extended or adjusted under 35 U.S.C. 154(b) by 664 days.

(21) Appl. No.: 10/882,673

(22) Filed: Jul. 2, 2004

(65) Prior Publication Data
US 2005/0030408 A1 Feb. 10, 2005

(30) Foreign Application Priority Data

| Jul. 3, 2003 | (JP) | ............................ 2003-190870 |
| Sep. 19, 2003 | (JP) | ............................ 2003-328531 |
| Oct. 16, 2003 | (JP) | ............................ 2003-356399 |
| Feb. 26, 2004 | (JP) | ............................ 2004-051789 |
| Jun. 30, 2004 | (JP) | ............................ 2004-194049 |

(51) Int. Cl.
*H04N 3/14* (2006.01)
*H04N 5/225* (2006.01)
*H04N 1/04* (2006.01)

(52) U.S. Cl. .................... 348/294; 348/374; 358/493
(58) Field of Classification Search ............... 348/249, 348/250, 281, 282, 208, 294, 298, 302, 311, 348/373, 374; 359/362, 364, 381, 392; 396/118, 396/248
See application file for complete search history.

(56) References Cited

U.S. PATENT DOCUMENTS

| 4,467,361 | A | * | 8/1984 | Ohno et al. | .................. 348/340 |
| 6,128,035 | A | * | 10/2000 | Kai et al. | .................. 348/208.2 |
| 6,285,400 | B1 | * | 9/2001 | Hokari | .................. 348/374 |
| 6,486,917 | B2 | * | 11/2002 | Iwasaki | .................. 348/375 |
| 6,849,843 | B2 | * | 2/2005 | Ansorge et al. | .................. 250/208.1 |
| 7,190,039 | B2 | * | 3/2007 | Boettiger et al. | .................. 257/432 |

FOREIGN PATENT DOCUMENTS

| JP | 6-133229 A | 5/1994 |
| JP | 10-108078 A | 4/1998 |
| JP | 2001-156278 A | 6/2001 |

* cited by examiner

*Primary Examiner*—David L Ometz
*Assistant Examiner*—Peter Chon
(74) *Attorney, Agent, or Firm*—Sughrue Mion, PLLC

(57) ABSTRACT

A solid-state image pickup device including a solid-state image pickup element which is curved in a light incident direction and a curvature changing portion which changes a curvature of the solid-state image pickup element, and an optical instrument including a lens unit and a solid-state image pickup element which is curved toward the lens unit and picks up taking an image focused by the lens unit wherein the curvature changing portion changes a curvature radius of the solid-state image pickup element so that the solid-state image pickup element is curved at a first curvature in a telephoto mode and the solid-state image pickup element is curved at a second curvature larger than the first curvature in a wide-angle mode.

33 Claims, 36 Drawing Sheets

CENTRAL PORTION

CENTRAL PORTION

F I G. 13
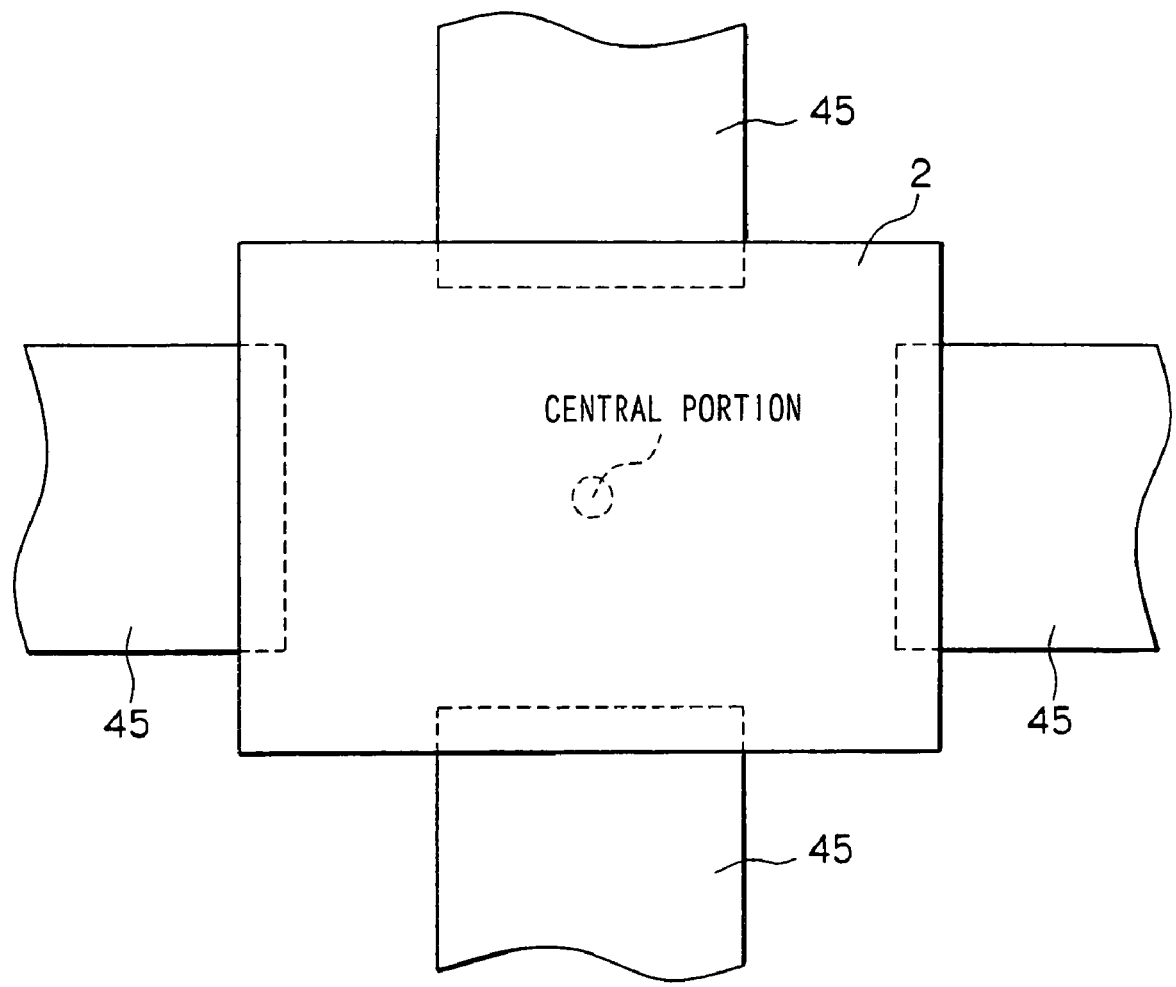

F I G. 1 4
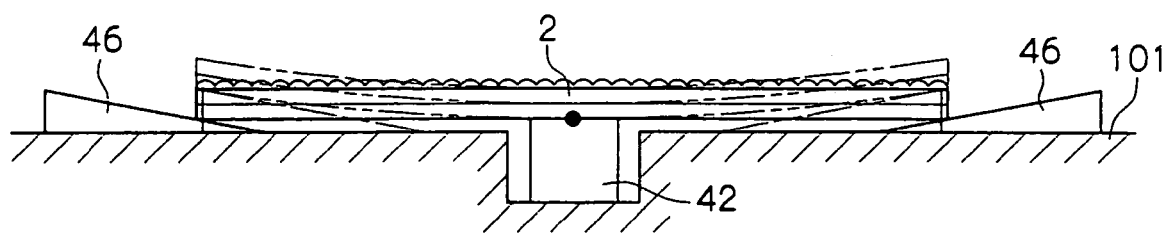

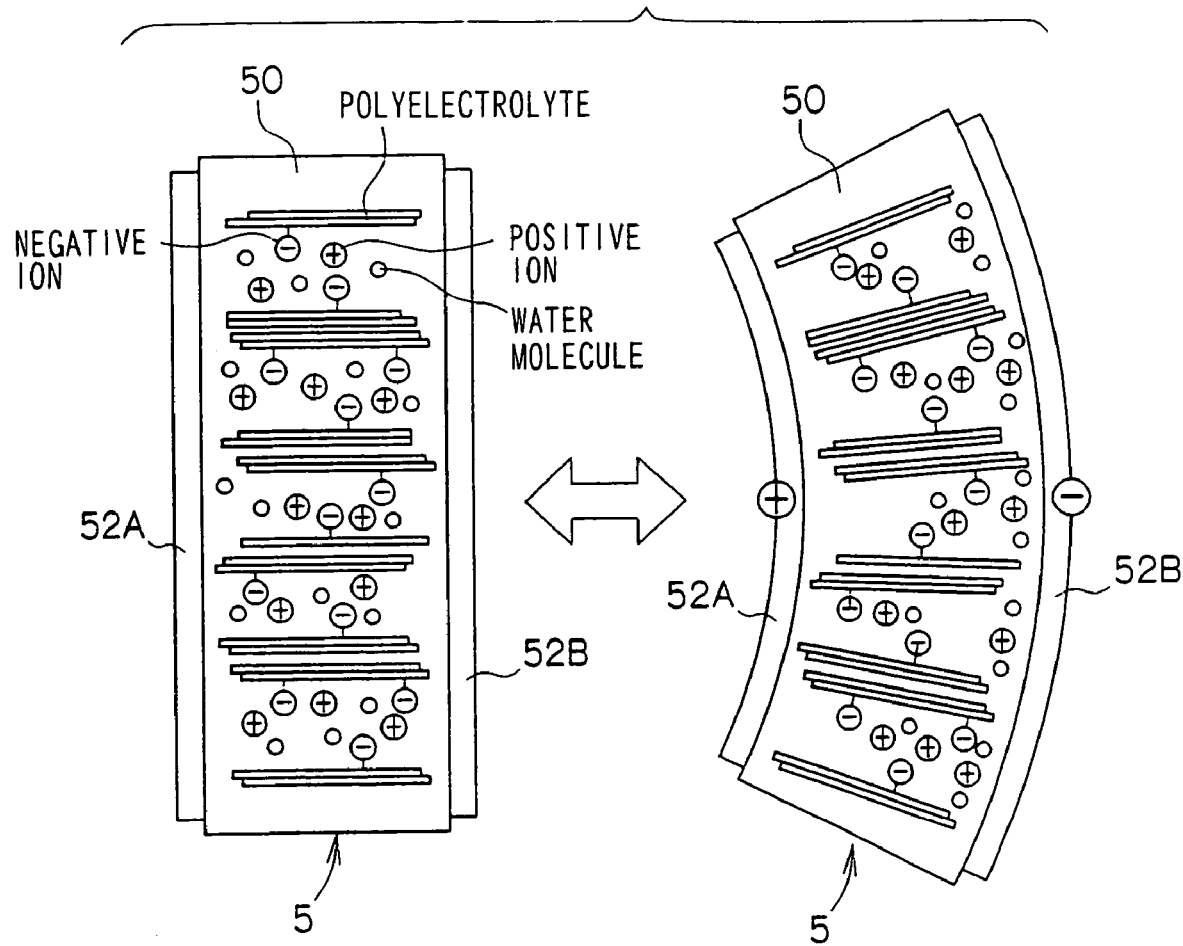
F I G. 18

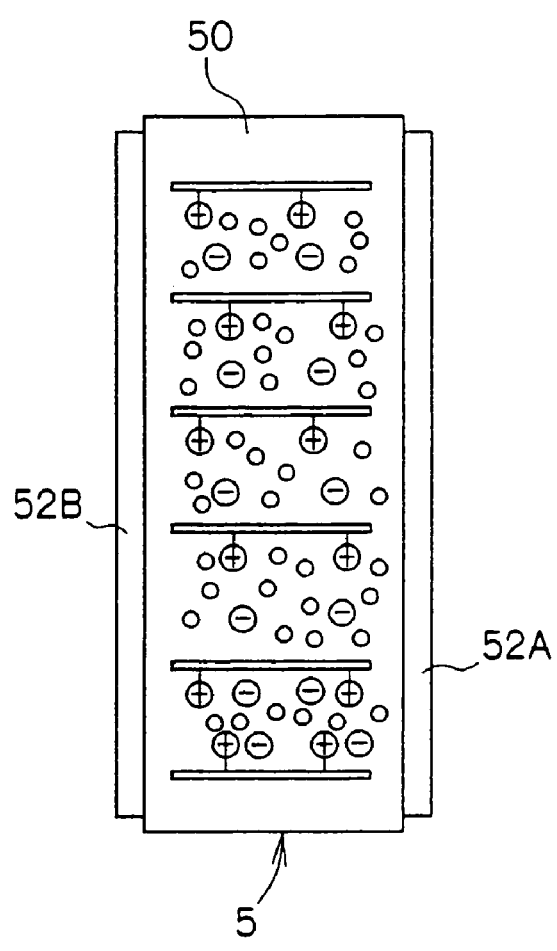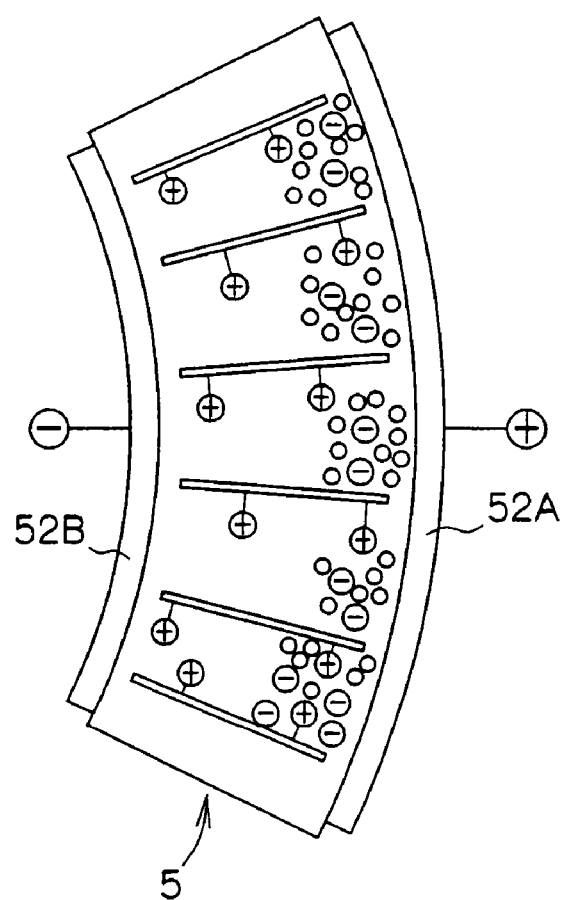

WIDE ANGLE

CLOSE-IN

TELEPHOTO

X ··· SAGITTAL IMAGE SURFACE
+ ··· MERIDIONAL IMAGE SURFACE

CURVATURE OF FIELD
OF WIDE-ANGLE MODE

X ··· SAGITTAL IMAGE SURFACE
+ ··· MERIDIONAL IMAGE SURFACE

CURVATURE OF FIELD
OF CLOSE-IN MODE

X ··· SAGITTAL IMAGE SURFACE
+ ··· MERIDIONAL IMAGE SURFACE

CURVATURE OF FIELD
OF TELEPHOTO MODE

X ··· SAGITTAL IMAGE SURFACE
+ ··· MERIDIONAL IMAGE SURFACE

CURVATURE OF FIELD
OF WIDE-ANGLE MODE

X ··· SAGITTAL IMAGE SURFACE
+ ··· MERIDIONAL IMAGE SURFACE

CURVATURE OF FIELD
OF CLOSE-IN MODE

X ··· SAGITTAL IMAGE SURFACE
+ ··· MERIDIONAL IMAGE SURFACE

CURVATURE OF FIELD OF
TELEPHOTO MODE

Wide
d=0.8mm
r=7mm

Middle
d=0.3mm
r=20mm

Tele

F I G. 28

Lens characteristics before curvature of CCD

|  | Wide (FIG. 27A) | Middle (FIG. 27B) | Tele (FIG. 27C) |
|---|---|---|---|
| TV distortion (%) | -2.0 | -0.4 | 0.0 |
| Ambient light quantity (%) | 72.2 | 79.6 | 93.0 |

F I G. 29

Curvature radius and the amount of movement of CCD in each zoom step

| | Wide (FIG. 27A) | Middle (FIG. 27B) | Tele (FIG. 27C) |
|---|---|---|---|
| Curvature radius of CCD in curvature (mm) | 7.0 | 20.0 | 0.0 |
| The amount of movement at end periphery of 1/2.7-inch CCD | 0.8 | 0.3 | 0.0 |

F I G. 30

Lens characteristics after curvature of CCD

|  | Wide (FIG. 27A) | Middle (FIG. 27B) | Tele (FIG. 27C) |
|---|---|---|---|
| TV distortion (%) | −0.5 | 0.0 | 0.0 |
| Ambient light quantity (%) | 51.6 | 74.1 | 93.0 |

F I G. 3 1
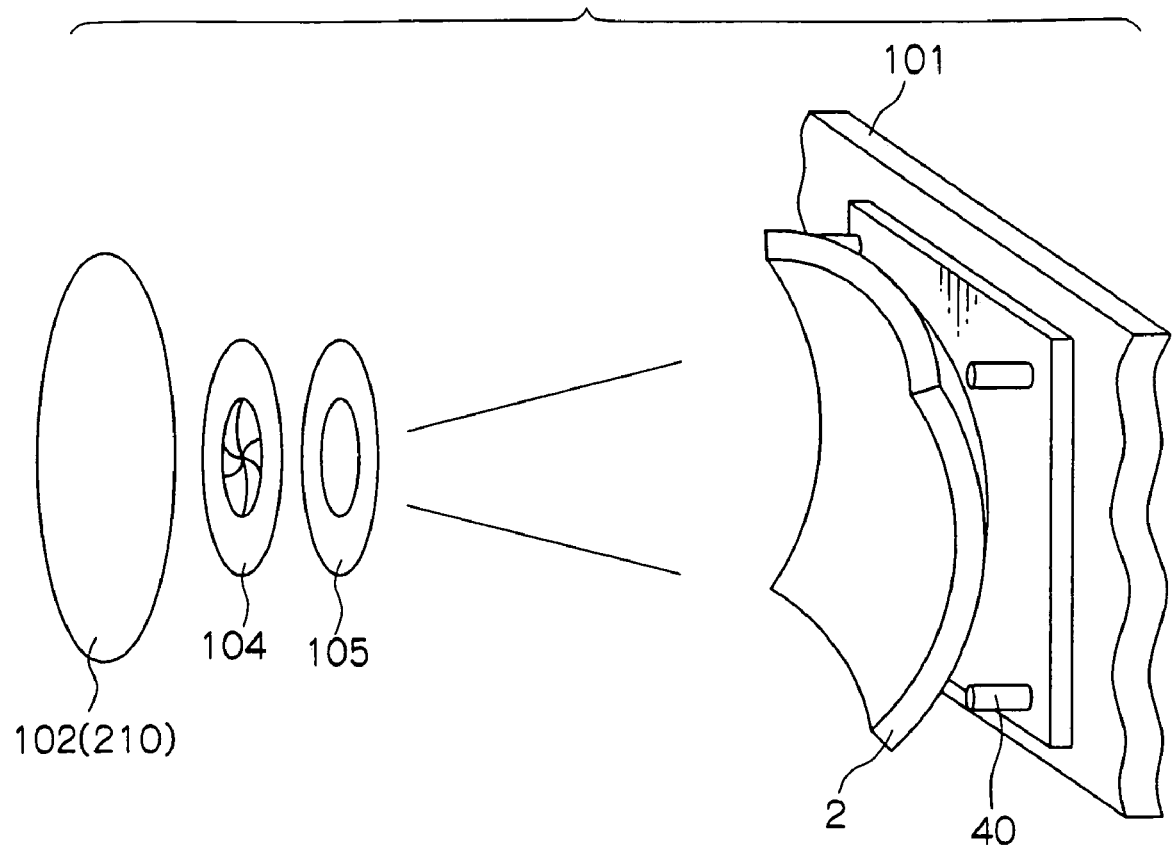

SOLID-STATE IMAGE PICKUP DEVICE AND OPTICAL INSTRUMENT USING THE SAME FOR ADJUSTING CURVATURES OF SOLID-STATE IMAGE PICKUP DEVICE BASED ON FOCAL LENGTH OF LENSES IN OPTICAL INSTRUMENT

CROSS-REFERENCE TO RELATED APPLICATION

This application claims priority under 35 USC 119 from Japanese Patent Application Nos. 2003-190870, 2003-328531, 2003-356399, 2004-51789 and 2004-194049, the disclosures of which are incorporated by reference herein.

BACKGROUND OF THE INVENTION

1. Field of the Invention

The present invention relates to a solid-state image pickup device and an optical instrument, particularly to the optical instrument in which shading, in which a peripheral portion of an image becomes dark, and image distortion due to aberration are not generated in a wide-angle mode, a telephoto mode, and a close-in mode, and the solid-state image pickup device used for the optical instrument.

2. Description of the Related Art

Recently, an electronic endoscope or a digital camera using a charge coupled device (CCD) for forming the image is widely used.

Usually, a micro lens is formed on a surface of CCD, and sensitivity is improved by effectively collecting light incident from an optical system onto the surface of CCD with the micro lens.

In the electronic endoscope, the miniaturization of the instrument is achieved by extremely decreasing a focal distance of the optical system such as the lens as short as 2 to 3 mm.

When CCD has a plane shape, a light beam incident from the optical system is obliquely incident to the micro lens in an end portion of a light receiving surface of CCD. At this point, because the micro lens is formed in a spherical shape of bilateral symmetry, the light obliquely incident to the micro lens does not reach to the light receiving surface of CCD. This allows generation of the shading in which the end portion of an image plane becomes dark.

The aberration in which distortion is generated in the image by difference in focal distance from the optical system between the central portion of the light receiving surface of CCD and the end portion of the light receiving surface becomes troublesome in the digital camera, so that the number of lenses is increased to reduce the aberration (curvature of field). Further, a decrease in ambient light quantity is reduced by the so-called lens shift in which the center of the micro lens is offset from the center of the light receiving portion of CCD.

However, it is necessary to decrease the number of lenses. In the lens shift, when an image pickup lens is different, since the amount of shift of the micro lens is also different, it is necessary to produce the new CCD. Further, there is a problem that the correction of the aberration of the image pickup lens by the lens shift is incomplete.

Therefore, in the electronic endoscope and the digital camera, that CCD is curved toward the optical system has been investigated (for example, see Japanese Patent Application Laid-Open (JP-A) Nos. 6-133229 and No. 2001-156278).

Alternatively, there has also been proposed a configuration provided with curvature adjusting means which adjusts a curvature by which a surface of a solid-state image pickup chip is curved (for example, see JP-A No. 10-108078).

However, in the case where a curvature of CCD is fixed at constant in the digital camera, as long as many lenses are not used in the optical system, there is the problem that the distortion of the image is easy to occur, when wide angle shooting is performed while the curvature of CCD is set to the telephoto mode.

SUMMARY OF THE INVENTION

In view of the foregoing, it is an object of the present invention to provide the optical instrument in which image distortion and shading are substantially eliminated in both the telephoto aspect and the wide-angle aspect and the solid-state image pickup device used for the optical instrument.

In the optical instrument which can set the close-in aspect in addition to the telephoto aspect and the wide-angle aspect, it is another object of the invention to provide the optical instrument in which image distortion and shading are almost eliminated even in the close-in aspect and the solid-state image pickup device used for the optical instrument.

A first aspect of the invention is to provide a solid-state image pickup device comprising a solid-state image pickup element which is curved in a light incident direction; and a curvature changing portion which changes a curvature of the solid-state image pickup element.

In the solid-state image pickup device of the first aspect of the invention, since the solid-state image pickup element is curved toward the light incident direction, when the solid-state image pickup device is used for such the optical instrument as the electronic endoscope in which the focal distance of the optical system is extremely small, the light from the optical system is perpendicularly incident to the surface of the solid-state image pickup element not only in the central portion of the solid-state image pickup element but also in the peripheral portion, so that the shading is prevented from generating in the peripheral portion of the image.

A second aspect of the invention is to provide an optical instrument comprising: a lens unit which has a plurality of lenses; a solid-state image pickup element which is curved in a concave shape toward the lens unit and picks up an image focused by the lens unit; and a curvature changing portion which changes a curvature of the solid-state image pickup element, wherein switching between at least a telephoto mode for shooting a distant subject and a wide-angle mode for shooting a wide range can be carried out, and the curvature of the solid-state image pickup element is changed by the curvature changing portion so that the solid-state image pickup element is curved at a first curvature in the telephoto mode and the solid-state image pickup element is curved at a second curvature that is larger than the first curvature in the wide-angle mode.

In the optical instrument, since the solid-state image pickup element is curved, light from the optical system is incident at an angle that is nearly a right angle with respect to the surface of the solid-state image pickup element not only at a central portion of the solid-state image pickup element, but also at a peripheral portion thereof, and therefore, shading is not generated in the end portion of the image, and distortion due to aberration is not generated.

In the general optical instruments, compared with the telephoto aspect which observes or shoots the distance, the image distortion due to the aberration tends to increase in the wide-angle aspect which observes and shoots the wide range. The image distortion due to the aberration is remarkable in the end portion of the image. In the optical instrument, the image distortion due to the aberration in the wide-angle aspect is corrected by changing the curvature of the solid-state image pickup element, so that, in both the wide-angle aspect and the telephoto aspect, the image with no distortion is obtained without using many lenses in the above-described lens unit in order to correct the aberration in the wide-angle aspect. Therefore, the good image is obtained even if the low-cost lens unit is used.

A third aspect of the invention is to provide an optical instrument characterized in that the curvature of the solid-state image pickup element is changed so that the solid-state image pickup element is curved at a third curvature larger than the second curvature in a close-in aspect for shooting a nearby subject.

In the general optical instruments, the image distortion due to the aberration tends to further increase in the close-in aspect which observes and shoots the nearby subject, compared with the wide-angle aspect. In the optical instrument of the third aspect of the invention, the image distortion due to the aberration in the close-in aspect is corrected by changing the curvature of the solid-state image pickup element at the third curvature radius smaller than the second curvature radius which is of the curvature radius in the wide-angle aspect, so that, in each of the wide-angle aspect, the telephoto aspect, and the close-in aspect, the image with no distortion is obtained without using many lenses in the lens unit in order to correct the aberration in the close-in aspect.

In a fourth aspect of the invention, the curvature changing portion includes an electric field curving actuator in which the solid-state image pickup element is curved and expanded by the change in electric field.

The curvature of the solid-state image pickup element can be changed in such a manner that the electric field curving actuator is bonded to the backside of the solid-state image pickup element and the movement of the electric field curving actuator is transmitted to the solid-state image pickup element to curve and expand the solid-state image pickup element.

In a fifth aspect of the invention, the curvature changing portion includes a mechanical actuator which bends and expands the solid-state image pickup element by mechanical movement.

The mechanical actuator is easy to interlock with a lever or a button changing between the wide-angle shooting and the telephoto shooting in the optical instrument, and the complicated electric circuit is not required, so that the mechanical actuator can be formed at low cost.

In a sixth aspect of the invention, the curvature changing portion includes a piezoelectric type actuator which bends and expands the solid-state image pickup element by a piezoelectric effect.

The mechanical actuator is easy to interlock with the lever or the button changing between the wide-angle shooting and the telephoto shooting in the optical instrument, and the complicated electric circuit is not required, so that the mechanical actuator can be formed at low cost.

A seventh aspect of the invention is to provide an optical instrument comprising: a lens unit which includes at least two groups of lenses; a solid-state image pickup element which is curved in a concave shape toward the lens unit and picks up an image focused by the lens unit; a curvature changing portion which changes a curvature of the solid-state image pickup element; and a zoom unit which zooms by changing a distance between at least two groups of lenses among the groups of lenses, wherein the curvature of the solid-state image pickup element is changed by the curvature changing portion together with the change in distance between the groups of lenses in the zoom unit.

In the optical instrument of the seventh aspect of the invention, for example, when the telephoto aspect is changed to the wide-angle aspect by changing the distance of the group of photographing lenses with the zoom unit, the curvature of the solid-state image pickup element is increased by the curvature changing portion. On the other hand, when the wide-angle aspect is changed to the telephoto aspect by changing the distance of the group of photographing lenses with the zoom unit, the curvature of the solid-state image pickup element is decreased by the curvature changing portion.

As described above, in the optical instrument of the seventh aspect of the invention, since the zoom operation in the zoom unit and the operation of changing the curvature of the solid-state image pickup element in the curvature changing portion are interlocked, the solid-state image pickup element is curved at the optimum curvature only by performing the zoom operation in the zoom unit.

An eighth aspect of the invention is to provide an optical instrument characterized in that the group of lenses is formed by one lens or a plurality of lenses.

A ninth aspect of the invention is to provide an optical instrument comprising: a lens unit which includes at least two groups of lenses; a solid-state image pickup element which picks up an image focused by the lens unit; a plurality of positioning screws which is integrated with the solid-state image pickup element and moves the solid-state image pickup element in an optical axis direction; a convex portion which changes a curvature of the solid-state image pickup element by pressing one selected from the group consisting of a portion of a light receiving surface of the solid-state image pickup element, a portion of a back surface of the solid-state image pickup element, and portions of both of the light receiving surface and the back surface of the solid-state image pickup element; a zoom unit which causes the lens unit to zoom by changing a distance between at least two groups of lenses among the groups of lenses; and a zoom interlock unit which changes the curvature of the solid-state image pickup element by the positioning screw together with the change in distance between the groups of lenses by the zoom unit.

In the optical instrument of the ninth aspect of the invention, when the imaging surface of the solid-state image pickup element is inclined or the curvature of field is corrected on the solid-state image pickup element side due to the large curvature of field at an adjusting step in shipment, the inclination of the imaging surface and the curvature of field which could not be adjusted by the conventional method such that a spacer is inserted between the solid-state image pickup element and the chassis can be finely adjusted, and man-hour required for the adjustment can be also largely decreased.

A tenth aspect of the invention is to provide an optical instrument comprising: a lens unit which includes at least two groups of lenses; a solid-state image pickup element which picks up an image focused by the lens unit; a plurality of positioning screws which is integrated with the solid-state image pickup element and moves the solid-state image pickup element in an optical axis direction; a convex portion which changes a curvature of the solid-state image pickup element by pressing one selected from the group consisting of a portion of a light receiving surface of the solid-state image pickup element, a portion of a back surface of the solid-state image pickup element, and portions of both of the light receiving surface and the back surface of the solid-state image pickup element; a zoom unit which causes the lens unit to zoom by changing a distance between at least two groups of lenses among the groups of lenses; and a zoom interlock unit which changes the curvature of the solid-state image pickup element by the positioning screw together with the change in distance between the groups of lenses by the zoom unit.

In the optical instrument of the tenth aspect of the invention, the curvature of the solid-state image pickup element is fluctuated by the convex portion and the positioning screw so as to respond to the focal plane fluctuated by the zoom operation of the lens, and the shading and the distortion can be prevented from generating.

An eleventh aspect of the invention is to provide an optical instrument comprising: a lens unit which includes at least two groups of lenses; a solid-state image pickup element which is curved in a convex or concave shape toward the lens unit and picks up an image focused by the lens unit; a curvature changing portion which changes a curvature of the solid-state image pickup element; and a zoom unit which zooms by changing a distance between at least two groups of lenses among the groups of lenses, wherein the curvature of the solid-state image pickup element is changed by the curvature changing portion together with the change in distance between the groups of lenses by the zoom unit.

In the optical instrument of the eleventh aspect of the invention, for example, when the telephoto aspect is changed to the wide-angle aspect by changing the distance of the group of photographing lenses with the zoom unit, the curvature of the solid-state image pickup element is decreased by the curvature changing portion. On the other hand, when the wide-angle aspect is changed to the telephoto aspect by changing the distance of the group of photographing lenses with the zoom unit, the curvature of the solid-state image pickup element is increased by the curvature changing portion.

As described above, in the optical instrument of the eleventh aspect of the invention, since the zoom operation in the zoom unit and the operation of changing the curvature of the solid-state image pickup element in the curvature changing portion are interlocked, the solid-state image pickup element is curved at the optimum curvature only by performing the zoom operation in the zoom unit.

A twelfth aspect of the invention is to provide an optical instrument comprising: a photographing lens unit; a solid-state image pickup element which picks up an image focused by the lens unit; and a curvature changing portion which changes a curvature of the solid-state image pickup element, wherein a curvature change releasing unit which releases the curving of the solid-state image pickup element by the curvature changing portion when power is turned off or when shooting is not carried out is provided.

In the optical instrument of the twelfth aspect of the invention, when the power of the optical instrument is turned off, the actuator or the positioning screw is automatically returned to the initial position, and the solid-state image pickup element is returned to the state before changing the curvature, i.e. the plane state. Therefore, an adverse effect such as the deformation of the solid-state image pickup element caused by the application of load for long hours can be prevented.

A thirteenth aspect of the invention is to provide an optical instrument comprising a photographing lens unit and a solid-state image pickup element which picks up an image focused by the lens unit, wherein at least one of the photographing lens unit and the solid-state image pickup element is curved.

In the optical instrument of the thirteenth aspect of the invention, the focusing or the collection of the aberration can be performed by curving the lens made of, e.g. a soft material.

A fourteenth aspect of the invention is to provide a solid-state image pickup device comprising: a solid-state image pickup element, which is curved in a light incident direction; and a support member, which fixes a curvature of the solid-state image pickup element.

In the solid-state image pickup device of the fourteenth aspect of the invention, the shading and the distortion can be prevented from generating without using the complicated adjustment mechanism by curving and holding the solid-state image pickup element combined with a single focal point lens at the predetermined curvature.

As described above, the invention can provide the solid-state image pickup device in which the image distortion is substantially eliminated in both the telephoto aspect and the wide-angle aspect and the solid-state image pickup device used for the optical instrument.

A fifteenth aspect of the present invention is to provide an optical instrument comprising: a photographing lens unit whose focal distance can be changed; and a solid-state image pickup element which picks up an image focused by the lens unit, wherein the curvature of the solid-state image pickup element is changed so as to form a concave cubic surface when viewed from the lens unit, in conjunction with the changing of the focal distance of the lens unit.

A sixteenth aspect of the present invention is to provide an optical instrument comprising: a photographing lens unit; and a solid-state image pickup element which is curved in a light incident direction, wherein a light receiving surface of the solid-state image pickup element does not correspond to an imaging surface of the photographing lens unit.

A seventeenth aspect of the present invention is to provide an optical instrument comprising: a photographing lens comprising a plurality of groups of lenses including at least a variable-power lens group and a focus adjusting lens group; and an adjusting portion which changes a curvature of a solid-state image pickup element which is curved in a light incident direction, along with changing of a focal distance by the variable-power lens group.

In the optical device of the seventeenth aspect of the invention, by curving the CCD in conjunction with the changing of the focal distance of the photographing lens, the surface shape of the CCD can be linked with the change in the focal distance of the photographing lens.

An eighteenth aspect of the present invention is to provide an optical instrument comprising: a photographing lens comprising a plurality of groups of lenses including at least a variable-power lens group and a focus adjusting lens group; and an adjusting portion which changes a curvature of a solid-state image pickup element which is curved in a light incident direction, along with focus adjustment by the focus adjusting lens group.

In the optical device of the eighteenth aspect of the invention, by curving the CCD in conjunction with the focusing operation of the photographing lens, the surface shape of the CCD can be linked with the focusing operation of the photographing lens.

A nineteenth aspect of the present invention is to provide an optical instrument comprising: a photographing lens comprising a plurality of groups of lenses including at least a variable-power lens group and a focus adjusting lens group; a first adjusting portion which changes a curvature of a solid-state image pickup element which is curved in a light incident direction, along with changing of a focal distance by the variable-power lens group; and a second adjusting portion which changes the curvature of the solid-state image pickup element which is curved in a light incident direction, along with focus adjustment by the focus adjusting lens group.

In the optical device of the nineteenth aspect of the invention, by curving the CCD in conjunction with the changing of the focal distance of the photographing lens and the focusing operation of the photographing lens, the surface shape of the CCD can be linked with the change in the focal distance of the photographing lens and the focusing operation of the photographing lens.

A twentieth aspect of the present invention is to provide an optical instrument comprising: a photographing lens comprising a plurality of groups of lenses including a focus adjusting lens group; and an adjusting portion which changes a curvature of a solid-state image pickup element which is curved in a light incident direction, along with focus adjustment by the focus adjusting lens group.

In the optical device of the eighteenth aspect of the invention, by curving the CCD in conjunction with the focusing operation of the photographing lens, the surface shape of the CCD can be linked with the focusing operation of the photographing lens.

A twenty-first aspect of the present invention is to provide an optical instrument according to the eighteenth aspect, further comprising: a detecting portion which detects a distance to a subject; and a second adjusting portion which changes the curvature of the solid-state image pickup element in accordance with the distance to the subject detected by the detecting portion.

In the optical device of the twenty-first aspect of the invention, by curving the CCD in accordance with the distance to the subject, the surface shape of the CCD can be linked with the photographing distance.

A twenty-second aspect of the present invention is to provide an optical instrument according to the nineteenth aspect, further comprising: a detecting portion which detects a distance to a subject; and a third adjusting portion which changes the curvature of the solid-state image pickup element in accordance with the distance to the subject detected by the detecting portion.

A twenty-third aspect of the present invention is to provide an optical instrument according to the twentieth aspect, further comprising: a detecting portion which detects a distance to a subject; and a second adjusting portion which changes the curvature of the solid-state image pickup element in accordance with the distance to the subject detected by the detecting portion.

A twenty-fourth aspect of the present invention is to provide an optical instrument according to the twenty-first aspect, wherein the second adjusting portion increases the curvature of the solid-state image pickup element when the detecting portion detects that the subject is close and decreases the curvature of the solid-state pickup element when the detecting portion detects that the subject is far away.

In the optical device of the twenty-fourth aspect of the invention, by curving the CCD largely at a short distance, at which the image surface curvature becomes large, and by curving the CCD slightly at a long distance, at which the image surface curvature becomes slight, the surface shape of the CCD can be linked with the change in the focal distance of the photographing lens.

A twenty-fifth aspect of the present invention is to provide an optical instrument according to the twenty-second aspect, wherein the third adjusting portion increases the curvature of the solid-state image pickup element when the detecting portion detects that the subject is close and decreases the curvature of the solid-state pickup element when the detecting portion detects that the subject is far away.

A twenty-sixth aspect of the present invention is to provide an optical instrument according to the twenty-third aspect, wherein the second adjusting portion increases the curvature of the solid-state image pickup element when the detecting portion detects that the subject is close and decreases the curvature of the solid-state pickup element when the detecting portion detects that the subject is far away.

A twenty-seventh aspect of the present invention is to provide an optical instrument comprising: a photographing lens comprising a plurality of groups of lenses including at least a variable-power lens group and a focus adjusting lens group; and a curvature adjusting portion which adjusts a curvature of a solid-state image pickup element which is curved in a light incident direction.

In the optical device of the twenty-seventh aspect of the invention, due to the curving of the CCD by the curvature adjusting portion, the surface shape of the CCD can be matched with the image surface curvature which changes in accordance with the change in the focal distance of the photographing lens, the focusing operation of the photographing lens, or both of these.

A twenty-eighth aspect of the present invention is to provide an optical instrument comprising: a photographing lens comprising a plurality of groups of lenses including at least a focus adjusting lens group; and a curvature adjusting portion which adjusts a curvature of a solid-state image pickup element which is curved in a light incident direction.

In the optical device of the twenty-eighth aspect of the invention, due to the curving of the CCD by the curvature adjusting portion, the surface shape of the CCD can be matched with the image surface curvature which changes in accordance with the focusing operation of the photographing lens.

A twenty-ninth aspect of the present invention is to provide an optical instrument comprising: a photographing lens comprising a plurality of groups of lenses including at least a variable-power lens group; and a curvature adjusting portion which adjusts a curvature of a solid-state image pickup element which is curved in a light incident direction.

In the optical device of the twenty-ninth aspect of the invention, due to the curving of the CCD by the curvature adjusting portion, the surface shape of the CCD can be matched with the image surface curvature which changes in accordance with the change in the focal distance of the photographing lens.

BRIEF DESCRIPTION OF DRAWINGS

FIG. 9A is a perspective view and FIG. 9B is a side view showing an example including a mechanical actuator respectively.

FIG. 13 is a plan view of the actuator portion of Example 1 shown in FIGS. 12A and 12B.

FIG. 14 is a side view showing the configuration of the actuator portion of Example 2.

FIG. 18 is a schematic view showing an example of the configuration of the electric field curving actuator used in the actuator portion of Example 5 shown in FIG. 17.

FIGS. 19A and 19B are a schematic view showing another example of the electric field curving actuator used in the actuator portion of Example 5 shown in FIG. 17.

FIG. 28 is a table showing the relationship between a focal distance and lens characteristics before curving CCD.

FIG. 29 is a table showing the relationship among the focal distance of a lens, a curvature radius of CCD, and an amount of movement.

FIG. 30 is a table showing the relationship between a focal distance and lens characteristics after curving CCD.

FIG. 31 is a perspective view showing the relationship between CCD curved in a concave spherical surface and the lens.

DETAILED DESCRIPTION OF THE INVENTION

First Embodiment (Optical Instruments)

Figure 3:
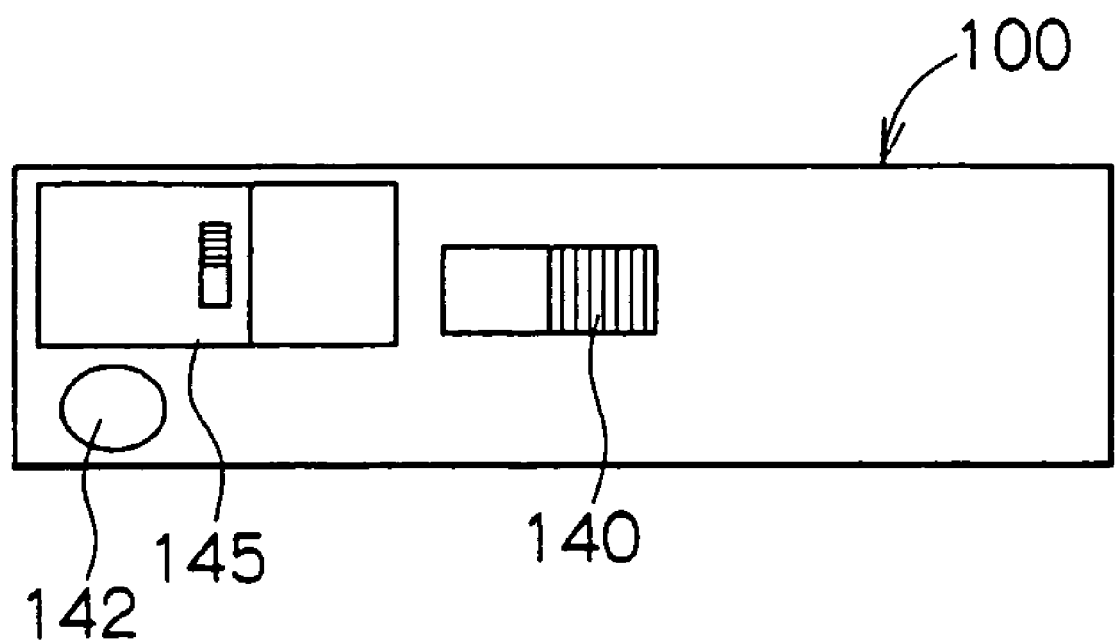
FIG. 3 is a plan view of the digital camera shown in FIG. 1 when viewed from above.
Figure 4:
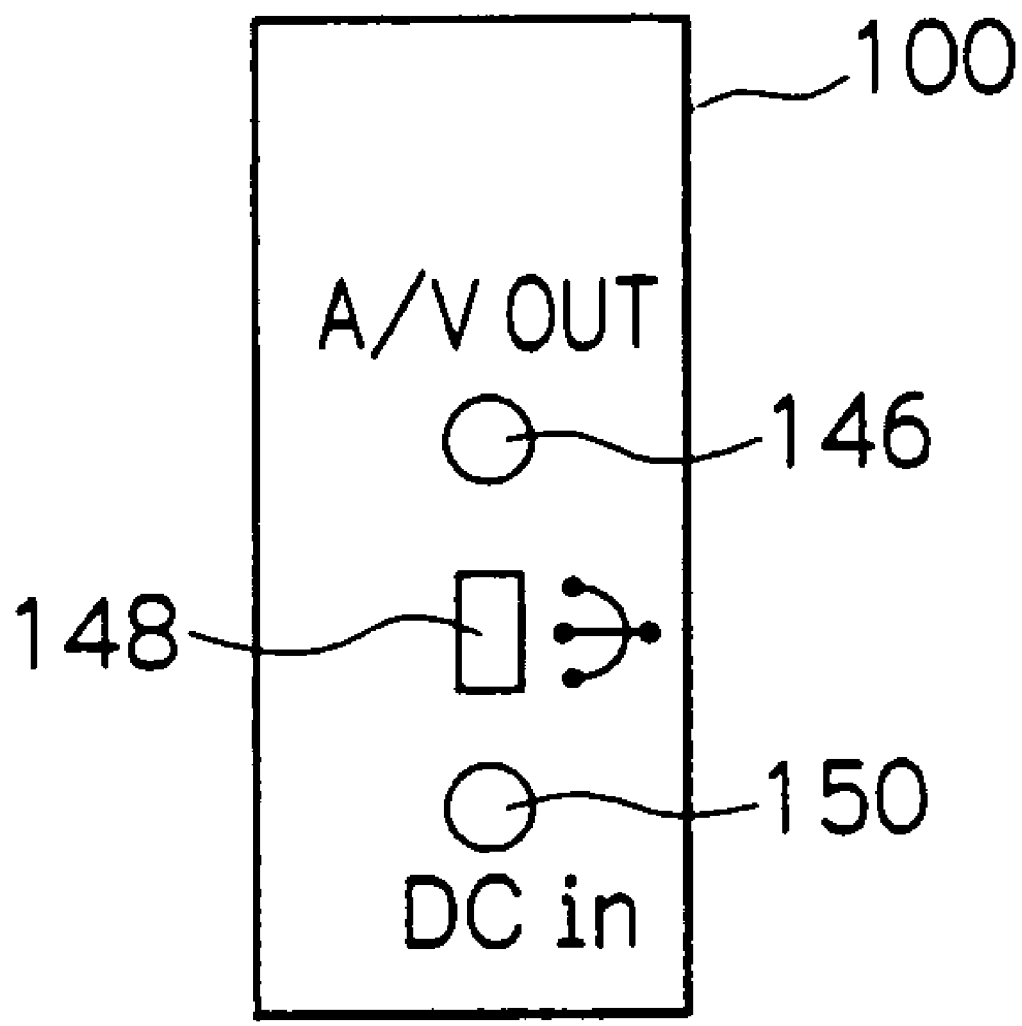
FIG. 4 is a side view of the digital camera shown in FIG. 1 when viewed from the left side.
Figure 5:
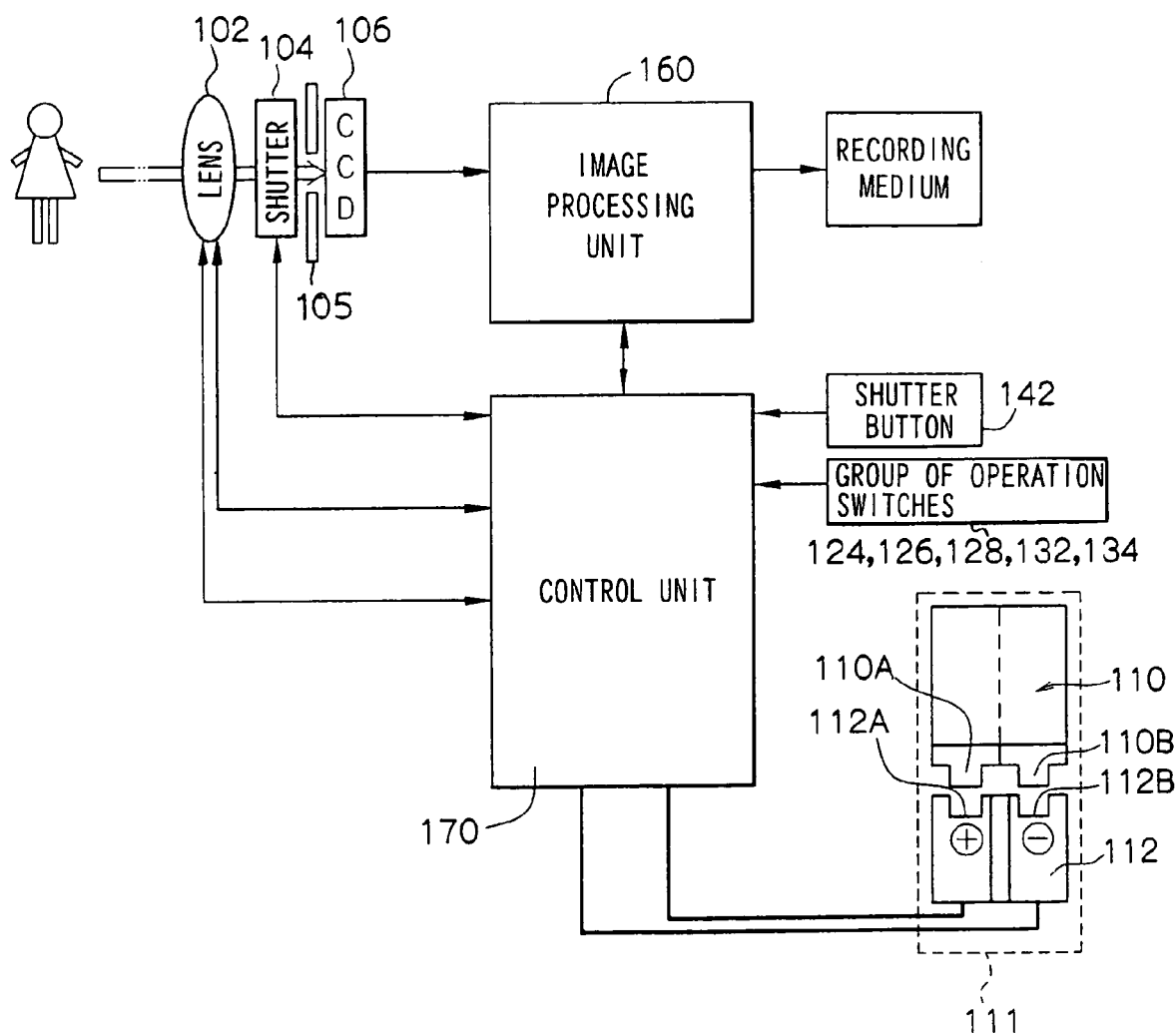
FIG. 5 is a block diagram schematically showing an internal configuration of the digital camera shown in FIG. 1.
Figure 6:
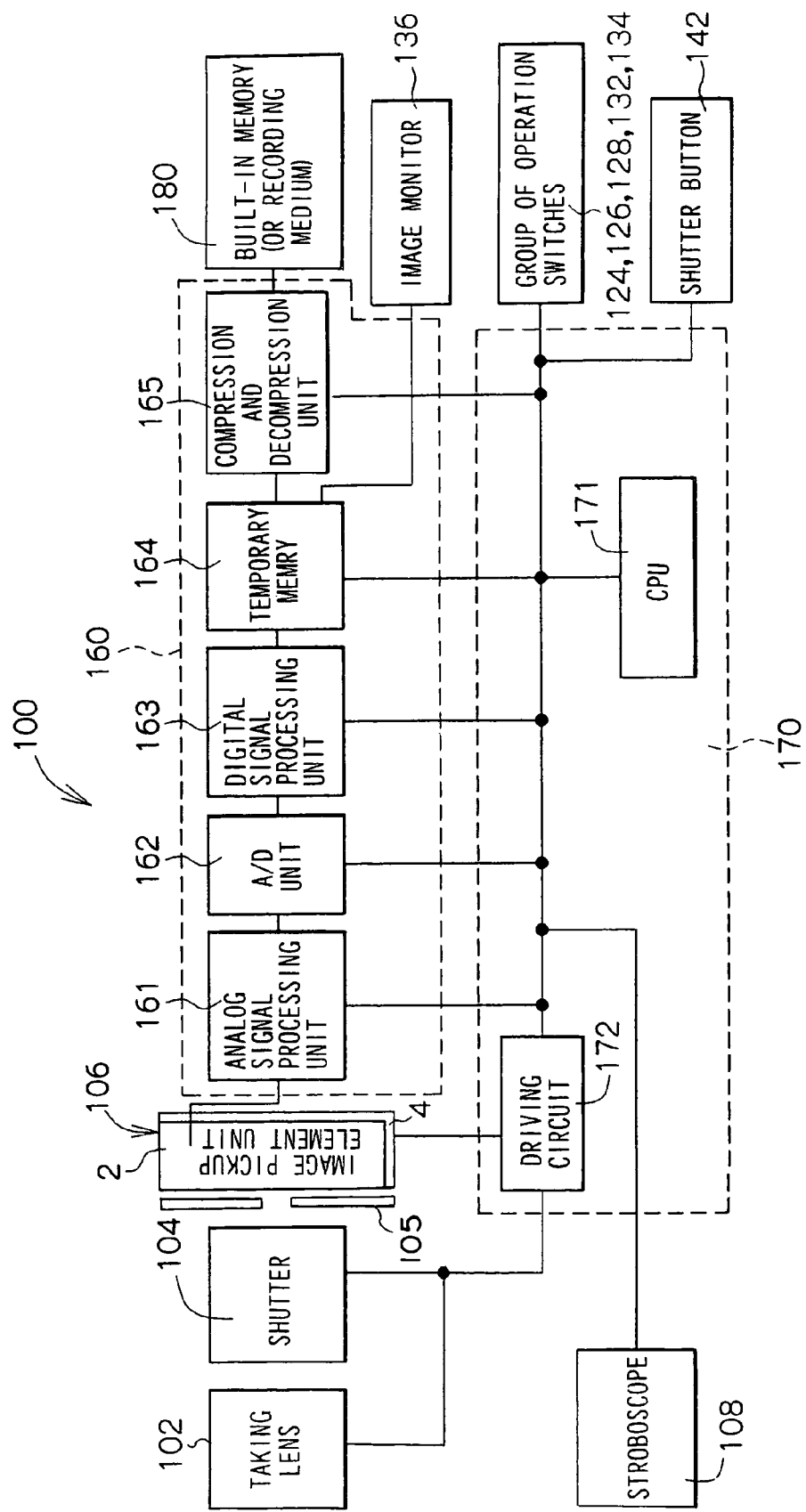
FIG. 6 is a block diagram schematically showing the internal configuration of the digital camera shown in FIG. 1.

FIGS. 1 to 4 show an appearance of a digital camera 100 which is of an example of the optical instrument of the present invention, and FIGS. 5 and 6 schematically show an internal configuration.

As shown in FIGS. 1 to 6, the digital camera 100 includes a photographing lens 102, a shutter 104, an iris 105, a CCD image pickup unit 106, and a stroboscope 108.

The CCD image pickup unit 106 is an example of the solid-state image pickup device according to the invention, and the photographing lens 102 corresponds to a lens unit having the optical instrument according to the invention.

Figure 2:
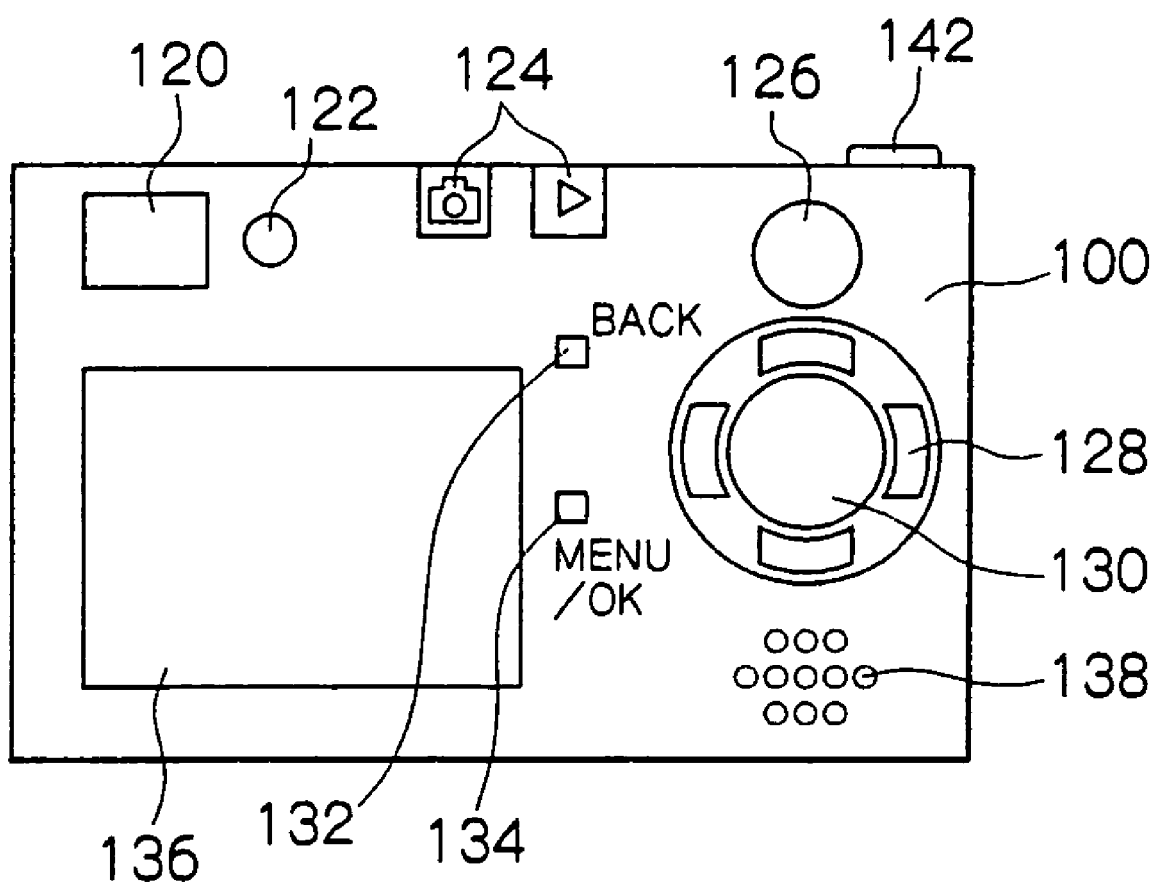
FIG. 2 is a rear view of the digital camera shown in FIG. 1.

As shown in FIG. 2, a viewfinder 120, a finder LED 122, a shooting/reproducing selection switch 124, a shooting mode selection dial 126, a multifunction cross-shaped key 128, a liquid crystal display unit 130 which displays an operation mode of the digital camera 100 or function of the multifunction cross-shaped key 128 with a character and an icon, a back switch 132, a menu/OK switch 134, a liquid crystal display monitor 136 which displays the image, and a speaker 138 are provided in a backside of the digital camera 100.

Figure 1:
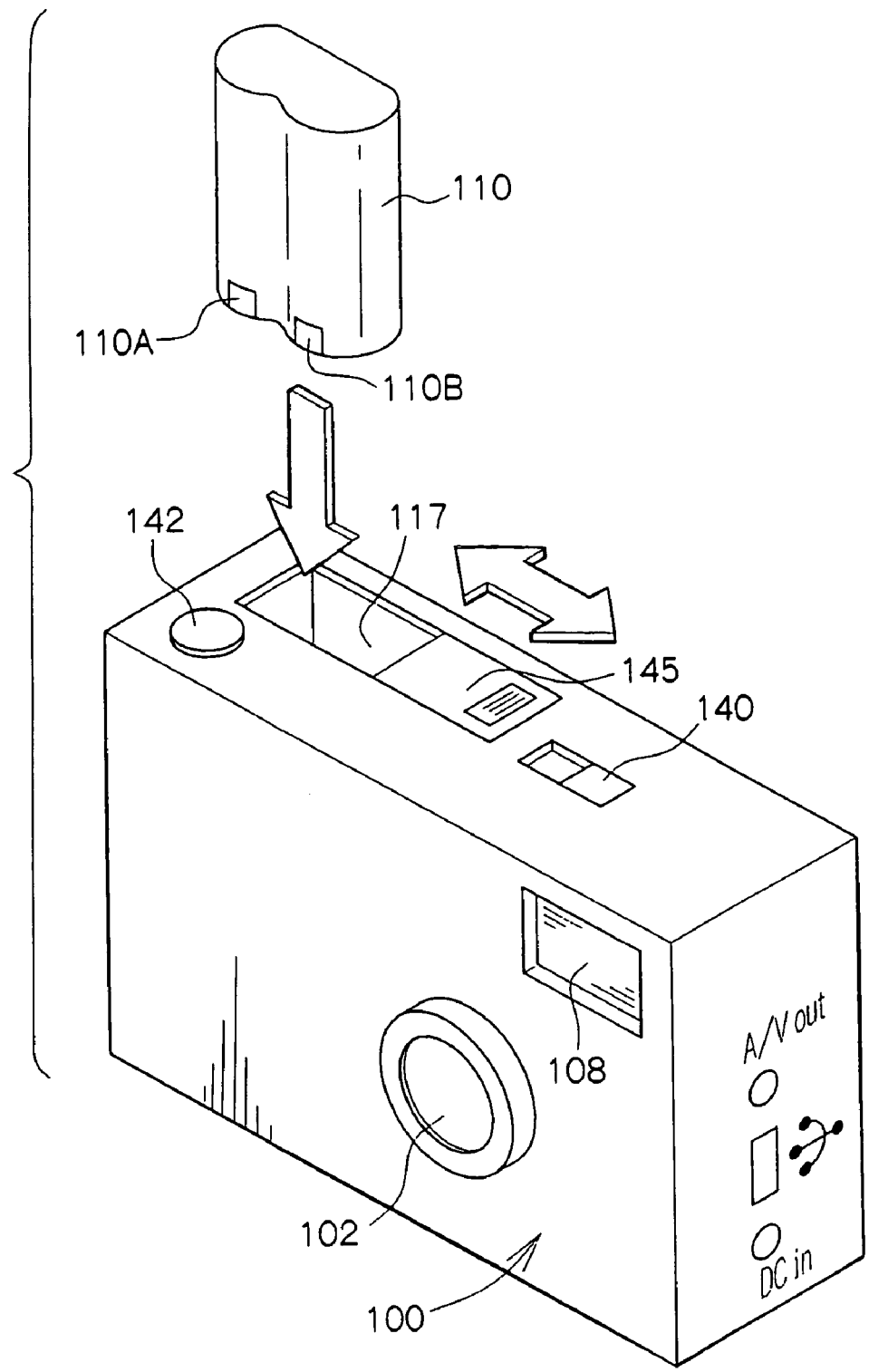
FIG. 1 is a perspective view showing an appearance of a digital camera according to a first embodiment.

As shown in FIGS. 1 and 3, a power switch 140, a shutter button 142, and a battery chamber cover 145 which covers a battery chamber 117 storing a lithium battery 110 are provided in an upper surface of the digital camera 100.

As shown in FIGS. 1 and 4, an audio/image output terminal 146, a USB terminal 148, and DC input terminal 150 are provided in a side face of the digital camera 100 when viewed from the right side.

In the digital camera 100, the shooting/reproducing selection switch 124 selects either the shooting mode or the reproducing mode. In the shooting mode, shooting mode selection dial 126 selects each mode such as manual shooting, automatic shooting, a telephoto mode, a wide-angle mode, a close-in mode, a moving picture, and a voice recorder. Telephoto shooting, wide-angle shooting, and close-in shooting are performed in the telephoto mode, the wide-angle mode, and the close-in mode respectively.

The liquid crystal monitor 136 is used as the electronic viewfinder, and the image shot by the camera and the reproduced image read out from the medium loaded in the camera are displayed on the liquid crystal monitor 136. Further, the liquid crystal monitor 136 performs various kinds of displays such as the display of the number of shootable frames, the display of the number of the reproduced frame, the display of presence of stroboscopic emission, the display of the shooting mode, the display of recording quality, and the display of the number of pixels according to the operation of the menu/OK switch 134 or the multifunction cross-shaped key 128.

As shown in FIGS. 5 and 6, the digital camera 100 has an image processing unit 160 which processes the image data from the CCD image pickup unit 106 to display the image on the liquid crystal monitor 136 or to record the image data in a built-in memory (or recording medium) 180 and a control unit 170 which controls the digital camera 100 on the basis of the input from the shutter button 142 and the group of operation switches including the shooting/reproducing selection switch 124, the shooting mode selection dial 126, the multifunction cross-shaped key 128, the back switch 132, and the menu/OK switch 134.

As shown in FIG. 6, the image processing unit 160 includes an analog signal processing unit 161, an A/D conversion unit 162, a digital signal processing unit 163, a temporary memory 164, and a compression and decompression unit 165.

The control unit 170 includes a driving circuit 172 and CPU 171 which controls the image processing unit 160. The driving circuit 172 performs condition setting of the photographing lens 102, the shutter 104, the CCD image pickup unit 106, and the stroboscope 108 and drives them on the basis of the operation of the group of operation switches.

For the analog image signal output from the CCD image pickup unit 106, the analog signal processing is performed in the analog signal processing unit 161 in the image processing unit 160, the A/D conversion is performed in the A/D conversion unit 162, and the digital signal processing is performed in the digital signal processing unit 163. The image data to which the digital signal processing is performed in the digital signal processing unit 163 is temporarily stored in the temporary memory 164, and the image data is compressed in the compression and decompression unit 165 and recorded in the built-in memory (or recording medium) 180. The image data temporarily stored in the temporary memory 164 can be also displayed on the liquid crystal display monitor 136. The image memory stored in the built-in memory (or recording medium) 180 can be read out to perform the de-compression processing by the compression and decompression unit 165, stored in the temporary memory 164, and displayed as the image on the liquid crystal monitor 136.

In the digital camera 100, the power of the image processing unit 160, the control unit 170, the photographing lens 102, the shutter 104, the CCD image pickup unit 106, the stroboscope 108, the liquid crystal display unit 130, and the liquid crystal monitor 136 is supplied from a power supply unit 111 as shown in FIG. 5. The power supply unit 111 is equipped with the lithium battery 110 and includes a socket 112 connected to the control unit 170.

As shown in FIG. 5, a positive terminal 112A connected to a positive electrode 110A of the lithium battery 110 and a negative terminal 112B connected to a negative electrode 110B of the lithium battery 110 are provided in the socket 112.

Figure 7:
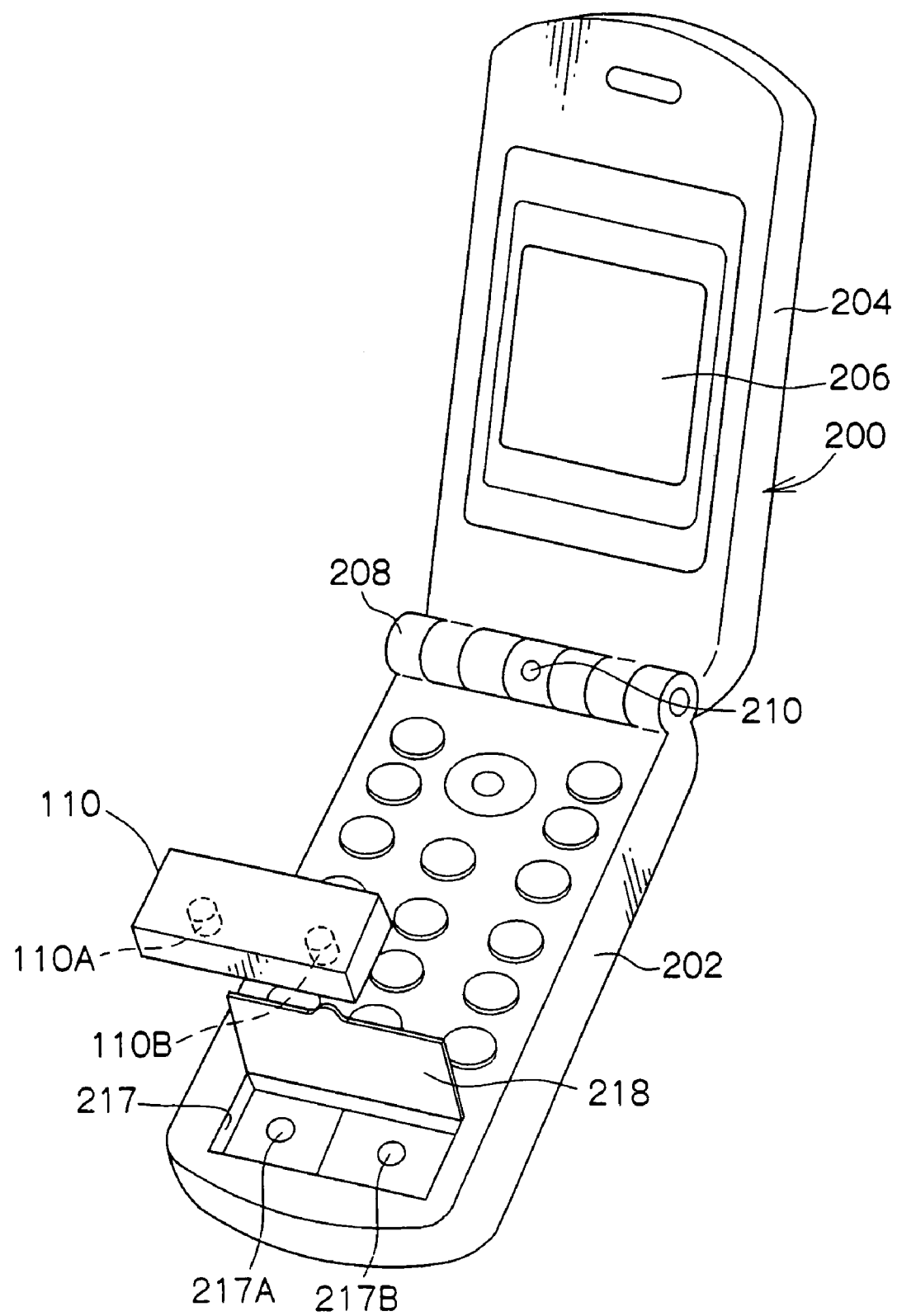
FIG. 7 is a perspective view showing the appearance of a camera-equipped cellular phone according to the first embodiment.

FIG. 7 shows the appearance of a camera-equipped cellular phone 200 which is of another example of the optical instrument according to the invention.

In FIG. 7, the same reference numeral as FIGS. 1 to 6 shows the same constituent features as FIGS. 1 to 6.

The camera-equipped cellular phone 200 is formed so as to be foldable in two as shown in FIG. 7. The camera-equipped cellular phone 200 includes an operation portion 202 in which a keyboard is provided, an image display portion 204 in which a display screen 206 is provided, and a hinge portion 208 which connects the operation portion 202 and the image display portion 204. A lens portion 210 for performing the shooting is provided in the hinge portion 208.

A battery storing chamber 217 which stores the lithium battery 110 is provided on the near side of the of the operation portion 202 in FIG. 7, i.e. in an edge portion opposite to the side where the hinge portion 208 is provided. The battery storing chamber 217 is opened and closed by a top 218. A positive terminal 217A connected to the positive electrode 110A of the lithium battery 110 and a negative terminal 217B connected to the negative electrode 110B of the lithium battery 110 are provided in a bottom of the battery storing chamber 217.

In the camera-equipped cellular phone 200, similarly to the digital camera 100, the shutter unit 104, the iris 105, and the CCD image pickup unit 106 are provided inside the lens portion 210 (the shutter unit 104, the iris 105, and the CCD image pickup unit 106 are not shown). The lens portion 210 and the CCD image pickup unit 106 correspond to the lens unit in the optical instrument according to the invention and the solid-state image pickup device according to the invention respectively.

Figure 8:
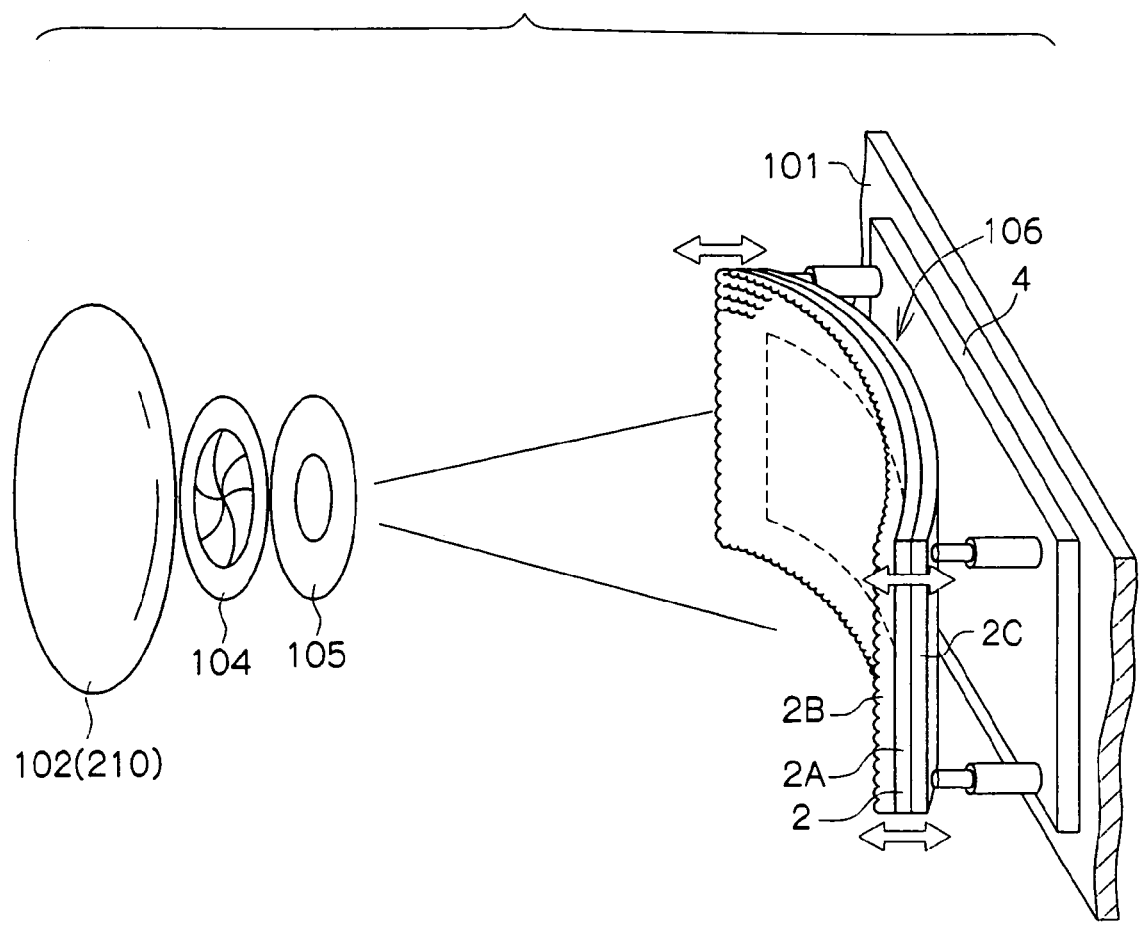
FIG. 8 shows a relatively positional relationship between a photographing lens or a lens portion and a shutter unit, an iris, and a CCD image pickup unit in the digital camera shown in FIG. 1 and the camera-equipped cellular phone shown in FIG. 7.

FIG. 8 shows a relatively positional relationship between the photographing lens 102 or the lens portion 210 and the shutter unit 104, the iris 105, and the CCD image pickup unit 106 in the digital camera 100 or the camera-equipped cellular phone 200.

As shown in FIG. 8, the CCD image pickup unit 106 is provided at a position where the image formed by the photographing lens 102 or the lens portion 210 is focused inside a chassis of the digital camera 100 and the camera-equipped cellular phone 200. The shutter unit 104 and the iris 105 are arranged near the photographing lens 102 or the lens portion 210 on the side facing the CCD image pickup unit 106.

Figure 22A:
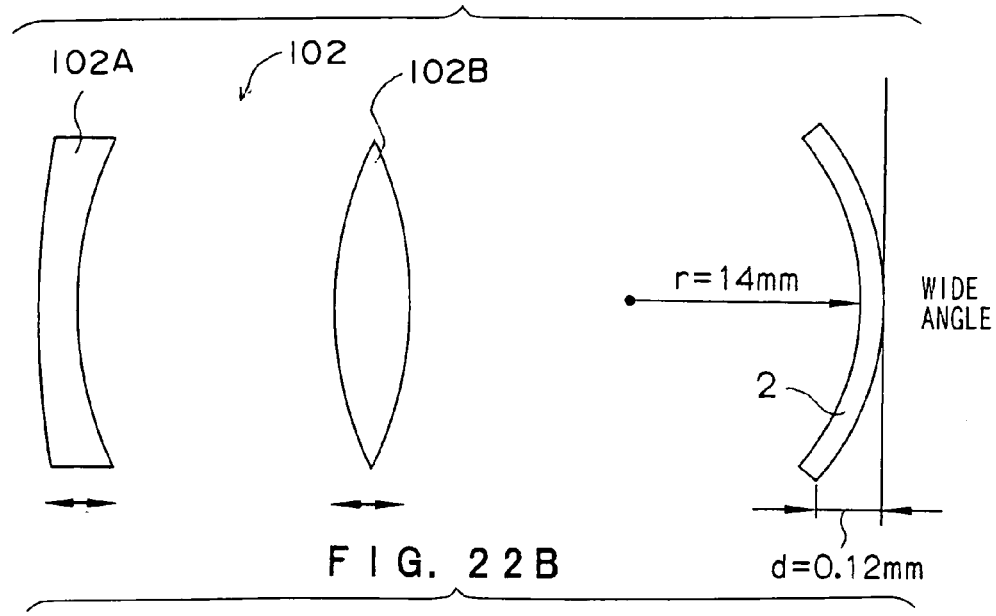
FIGS. 22A to 22C are a schematic view showing a relationship between a mode of the digital camera and a curvature of CCD.
Figure 22B:
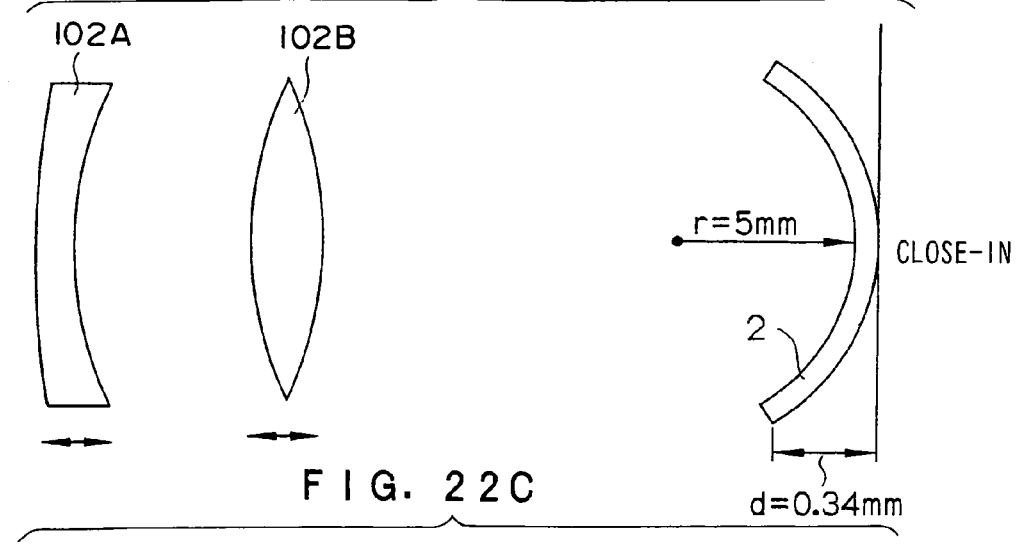
Figure 22C:
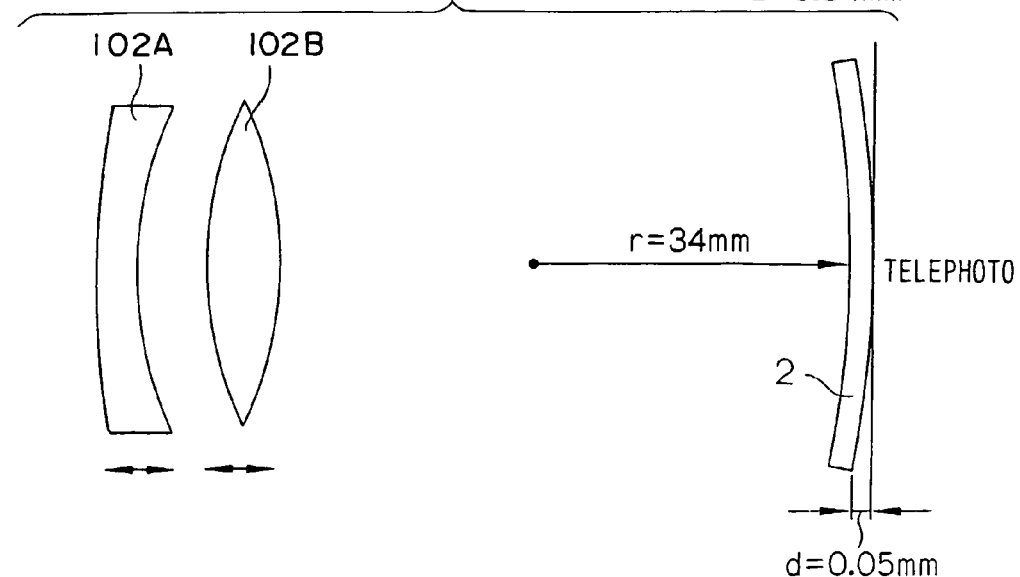

As shown in FIGS. 22A to 22C, the photographing lens 102 or the lens portion 210 comprises a first lens 102A in the shape of a concave lens and a second lens 102B in the shape of a convex lens which is arranged on the same optical axis as the first lens 102A and inside the first lens 102A. The first lens 102A and the second lens 102B correspond to the lens group in the invention. A first lens group and a second lens group which include a plurality of lenses respectively can be arranged instead of the first lens 102A and the second lens 102B.

The CCD image pickup unit 106 has CCD 2 which is curved toward the photographing lens 102 or the lens portion 210 and an actuator portion 4 which increases and decreases curvature of a CCD image pickup element portion 2 while pressing four corners of CCD 2 to curve the CCD 2.

As shown in FIG. 8, CCD 2 has a flexible substrate 2C, a group of CCD elements 2A which is the group of the CCD elements formed on a surface of the flexible substrate 2C, and a micro lens 2B which is laminated on the group of the CCD elements 2A so as to correspond to each CCD element constituting the group of the CCD elements 2A.

The flexible substrate 2C can be made of a plastic substrate, thin glass substrate, or a metal substrate, and the flexible substrate 2C made of the plastic substrate is preferable from a flexible point of view.

CCD 2 can be manufactured in the following manner.

At first, an etching stopper layer is formed on the surface of the glass substrate, and a polycrystalline silicon layer is laminated on the etching stopper layer. Crystallization is performed by irradiating the polycrystalline silicon layer with a solid-state laser beam to form the group of the CCD elements 2A.

A removable adhesion agent is applied onto the surface of the formed group of the CCD elements 2A to bond a tentative substrate. After the tentative substrate is bonded, the glass substrate is removed by the etching with hydrofluoric acid or the like to expose the group of the CCD elements 2A.

Then, the plastic substrate which becomes the flexible substrate 2C is bonded to the exposed group of the CCD elements 2A, and the tentative substrate is removed to obtain the group of the CCD elements 2A laminated on the flexible substrate 2C.

Finally the micro lens 2B is formed on the surface of the group of the CCD elements 2A so as to correspond to each CCD element.

As shown in FIG. 8, CCD 2 is curved so that the surface of the side on which the micro lens 2B is laminated is formed in the concave shape, while arranged so that the surface of the side on which the micro lens 2B is laminated faces a light incident direction.

It is also possible that CCD 2 used for the CCD image pickup unit 106 is a TFT circuit device in which CCD, the memory storing the image data from CCD, an interface unit connecting CCD and the memory are integrally formed in one substrate.

In the CCD image pickup unit 106, CMOS can be used instead of CCD 2.

Similarly to CCD 2, CMOS including the flexible substrate, a group of CMOS elements which is of the group of the CMOS elements laminated on the flexible substrate, and the micro lens laminated on the surface of the group of CMOS elements so as to correspond to each CMOS element can be cited. It is also possible that CMOS does not include the micro lens.

CMOS can be produced in the same way as CCD 2 except the group of CMOS elements is formed on the glass substrate instead of the group of CCD elements. When CMOS without the micro lens is formed, a process of forming the micro lens can be omitted.

The actuator portion 4 is inserted between CCD 2, the digital camera 100, and the chassis of the camera-equipped cellular phone 200.

(Actuator Portion)

The configuration of the actuator portion 4 will be described below.

Figure 9A:
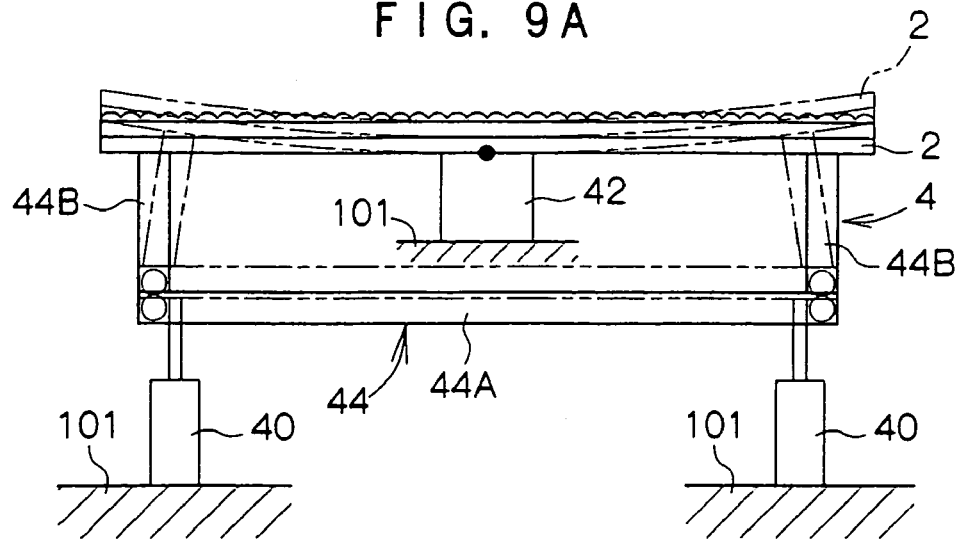
FIGS. 9A and 9B show an actuator portion in the digital camera and the camera-equipped cellular phone.
Figure 9B:
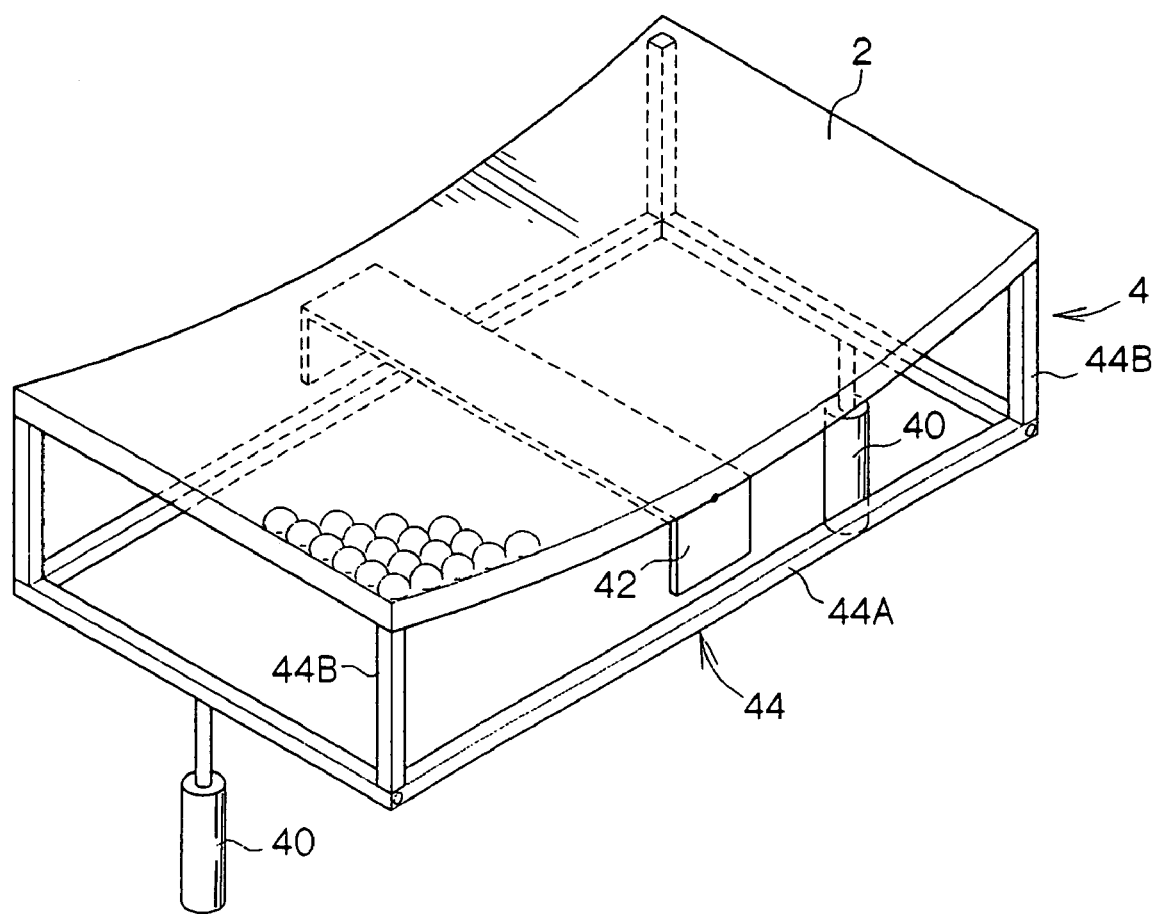

FIGS. 9A and 9B show the configuration of the actuator portion 4.

As shown in FIGS. 9A and 9B, the actuator portion 4 includes a CCD fixing member 42 which fixes a central portion of CCD 2 to the inside of a chassis 101, an actuator 40 which presses the edge portion of CCD 2 toward the photographing lens 102 or the lens portion 210 to curve CCD 2, and a transmitting member 44 which transmits movement of the actuator 40 to the edge portion of CCD 2. FIG. 9A is the side view explaining the movement of the actuator portion 4, and FIG. 9B is the perspective view when obliquely viewed from above.

The actuator 40 is inserted between the transmitting member 44 and the chassis 101.

A screw actuator with a screw, an electrostriction element actuator using an electrostriction element in which dimensions are increased or decreased by application of voltage, a conductive polymer actuator which is expanded by taking in a negative ion when the positive voltage is applied and is compressed by releasing the negative ion when the negative voltage is applied, and a shape memory alloy actuator utilizing compression and expansion of the shape memory alloy by temperature can be cited as an example of the actuator 40. In the case where the optical instrument has a zoom mechanism which changes a relative position between the first lens 102A and the second lens 102B according to each of the wide-angle mode, the telephoto mode, and the close-in mode specified by the shooting mode selection dial 126, a CCD curving mechanism which transmits the movement of the zoom mechanism to CCD 2 while converting the movement of the zoom mechanism into the movement curving CCD 2 is also included in the actuator 40. In the actuator 40, the screw actuator and the CCD curving mechanism are an example of a mechanical actuator in the invention, the electrostriction element actuator and the conductive polymer actuator are an example of an electric field curving actuator, and shape memory alloy actuator is an example of a temperature-sensitive type actuator.

Figure 10A:
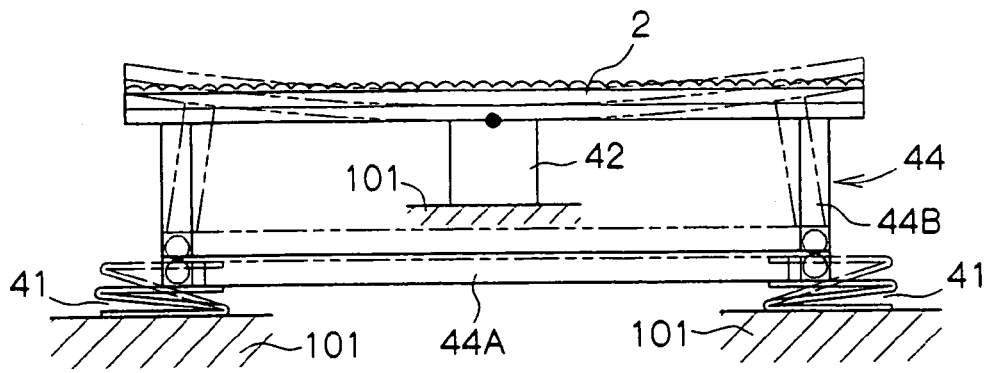
FIG. 10A is a side view and FIG. 10B is a perspective view showing an example using a shape memory alloy actuator as the actuator in the actuator unit respectively.
Figure 10B:
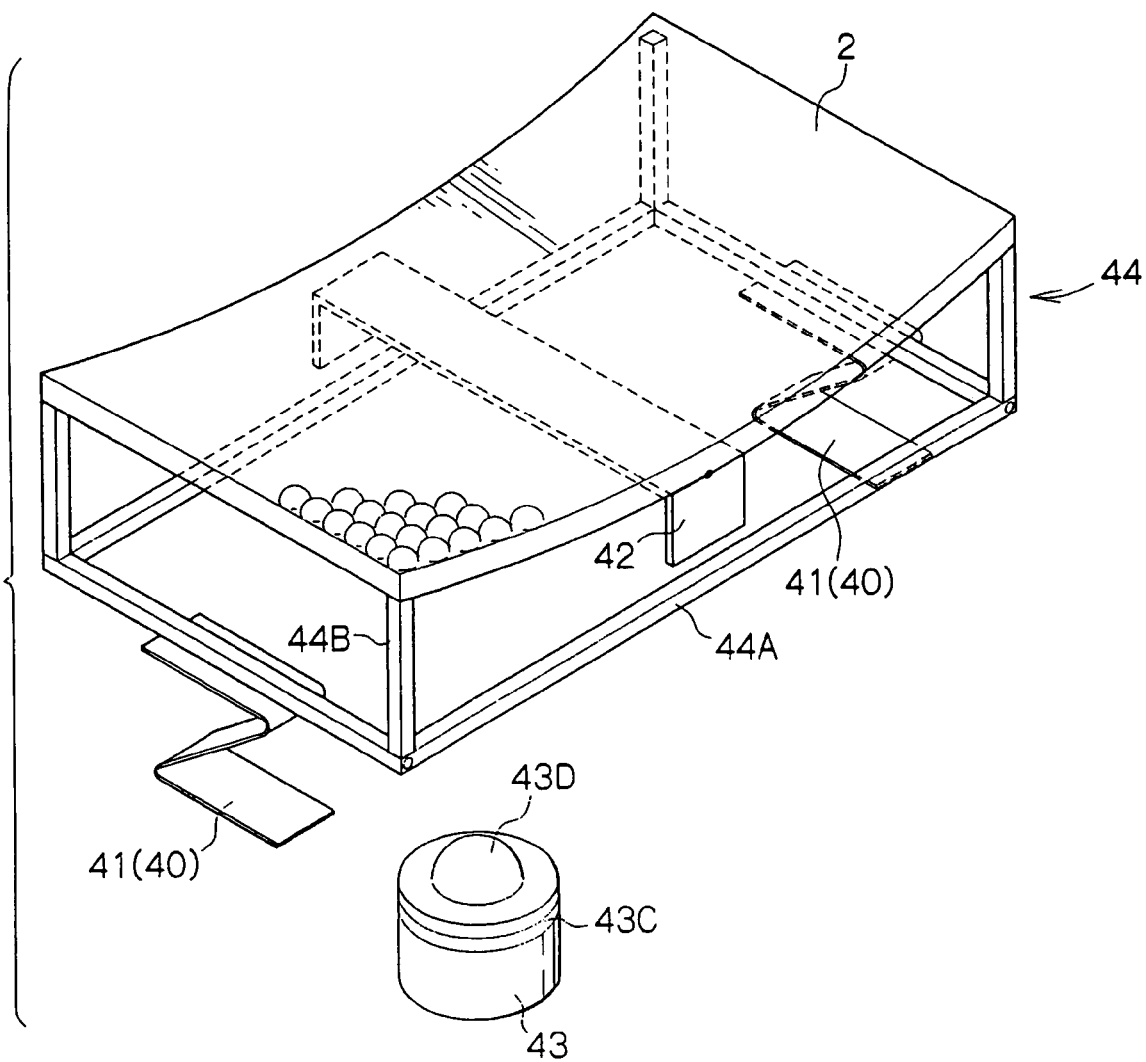

FIGS. 10A and 10B show an example in which the shape memory alloy actuator is provided as the actuator 40. FIG. 10A is the side view explaining the movement of the actuator portion 4, and FIG. 10B is the perspective view when obliquely viewed from above.

In the actuator portion 4 shown in FIGS. 10A and 10B, a Z-shaped actuator 41 having a form in which long plate material made of the shape memory alloy is formed in the Z-shape is used as the shape memory alloy actuator. For the purpose of easy understanding of the movement of the Z-shaped actuator 41, although the Z-shaped actuator 41 is shown in FIG. 10A so as to be arranged while being orthogonal to a frame body 44A, the Z-shaped actuator 41 is actually arranged along the frame body 44A as shown in FIG. 10B.

The Z-shaped actuator 41 is in a compressed state during heating as indicated by a solid line in FIG. 10A, and the Z-shaped actuator 41 is expanded by cooling the Z-shaped actuator 41 below room temperature as shown by a chain double-dashed line in FIG. 10A.

In addition to the Z-shaped actuator 41, a diaphragm type actuator 43 can be cited as the shape memory alloy actuator used in the actuator portion 4.

Figure 11:
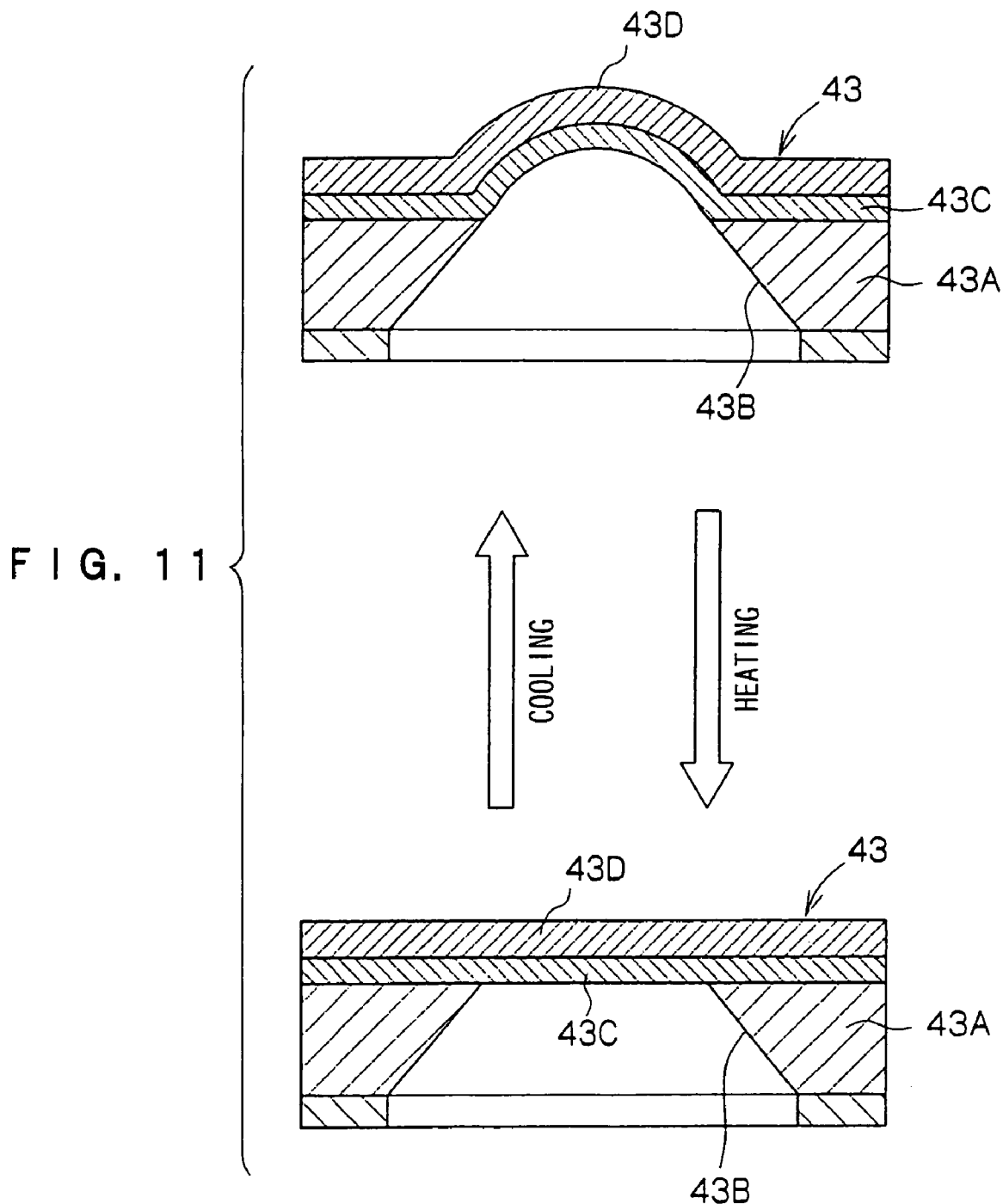
FIG. 11 is a sectional view showing a configuration of a diaphragm type actuator which is of an example of the shape memory alloy actuator included in the actuator portion shown in FIGS. 10A and 10B.

As shown in FIGS. 10B and 11, in the diaphragm type actuator 43, a $SiO_2$ film 43C is formed on the surface of a substrate 43A in which a conical cavity portion 43B decreasing toward the surface is provided, and a shape memory alloy film 43D is laminated on the $SiO_2$ film 43C. The shape memory alloy film 43D and the $SiO_2$ film 43C are planarized when the shape memory alloy film 43D and the $SiO_2$ film 43C are heated, and an upper part of the cavity portion 43A is raised when the shape memory alloy film 43D and the $SiO_2$ film 43C is cooled.

As shown in FIGS. 9A, 9B, 10A, and 10B, the transmitting member 44 includes the rectangular frame body 44A fixed to the front end of the actuator 40 and connecting rod 44B which connects the four corners of the frame body 44A and the four corners of CCD 2. In the actuator portion 4, instead of separately providing the CCD fixing member 42, it is also possible that the central portion of the frame body 44A is fixed to the chassis 101 of the digital camera 100 or the like.

(Action and Effect)

Action of the actuator portion 4 will be described below.

In the digital camera 100 and the camera-equipped cellular phone 200, when any one of the telephoto mode, the wide-angle mode, and the close-in mode is selected by the shooting/reproducing selection switch 124 or the multifunction cross-shaped key 128, a direction of the mode selection is input to the driving circuit 172.

In the driving circuit 172, CCD 2 is curved at the minimum curvature when the telephoto mode is input, CCD 2 is curved at the second smallest curvature when the wide-angle mode is input, and CCD 2 is curved at the maximum curvature when the close-in mode is input. When the actuator 40 included in the actuator portion 4 is the screw actuator or the CCD curving mechanism, the driving circuit 172 controls the number of pulse signals to a pulse motor driving the screw actuator or the CCD curving mechanism. When the actuator 40 is the electrostrictive element actuator or the conductive polymer actuator, the driving circuit 172 controls the voltage applied to the actuator 40. When the actuator 40 is the temperature-sensitive type actuator such as the Z-shaped actuator 41 and the diaphragm type actuator 43, the driving circuit 172 controls a magnitude of electric current flowing through a heater circuit heating the temperature-sensitive type actuator.

In the actuator portion 4, when the direction is input, the actuator 40 is activated so that CCD 2 is curved at the predetermined curvature.

When the actuator 40 is expanded by the direction input from the driving circuit 172, the four corner portions of CCD 2 is pressed toward the side of the photographing lens 102 or the lens portion 210 through the frame body 44A and the connecting rod 44B to curve CCD 2 as shown by the chain double-dashed line in FIGS. 9A and 9B. Therefore, the curvature of CCD 2 is increased, in other words, CCD 2 is curved more strongly because a curvature radius is decreased.

On the contrary, when the actuator 40 is compressed by the direction, because the frame body 44A and the connecting rod 44B are retreated as shown by the solid line in FIGS. 9A and 9B, CCD 2 is expanded by elastic force of itself to come to a plane, in other words, the curvature is decreased and the curvature radius is increased.

As described above, the curvature of CCD 2 can be changed by compressing and expanding the actuator 40 or by cooling or heating the Z-shaped actuator 41 or the diaphragm type actuator 43.

FIGS. 22A, 22B, and 22C show the relatively optional relationship between the first lens 102A and the second lens 102B in the photographing lens 102 when the wide-angle mode, the close-in mode, and the telephoto mode are selected in the digital camera 100 and the camera-equipped cellular phone 200 respectively. The wide-angle mode can be also referred to as a zoom mode.

In the wide-angle mode, as shown in FIG. 22A, the second lens 102B approaches to CCD 2 while moving away from the first lens 102A. In the telephoto mode, as shown in FIG. 22C, the first lens 102A approaches to CCD 2 at the same time when the second lens 102B moves away from CCD 2, and the first lens 102A and the second lens 102B approach to each other. In the close-in mode, as shown in FIG. 22B, the first lens 102A holds the same position as the wide-angle mode and the second lens 102B proceeds toward the first lens 102A.

Figure 24A:
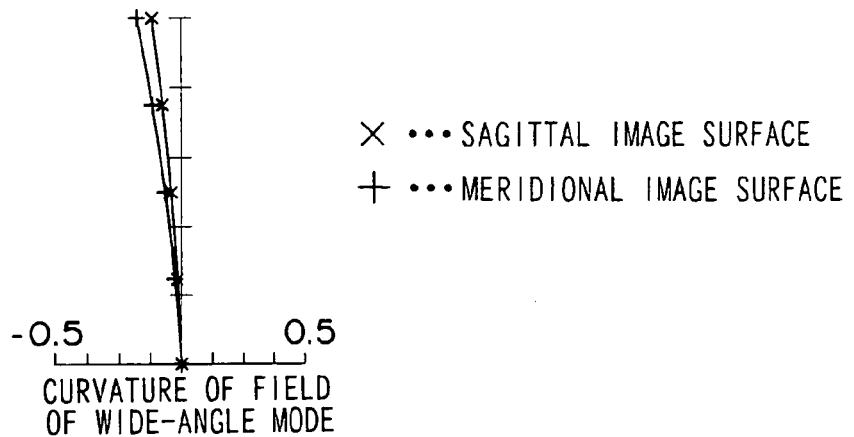
FIGS. 24A to 24C are a graph showing the curvature of field in each mode when CCD is not curved.
Figure 24B:
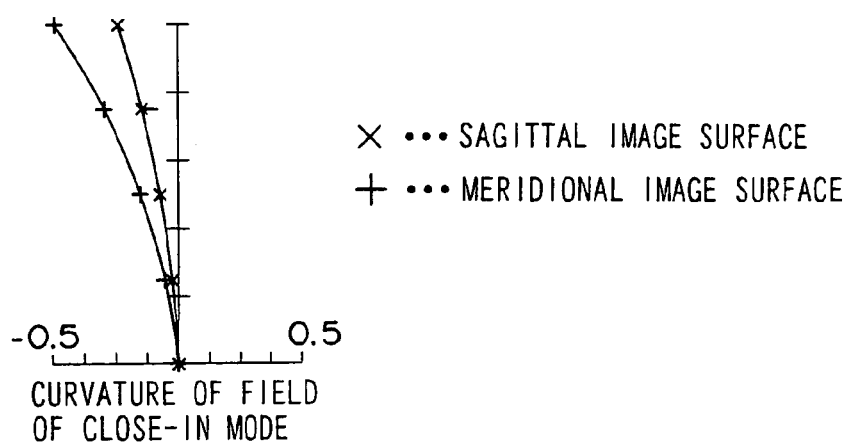
Figure 24C:
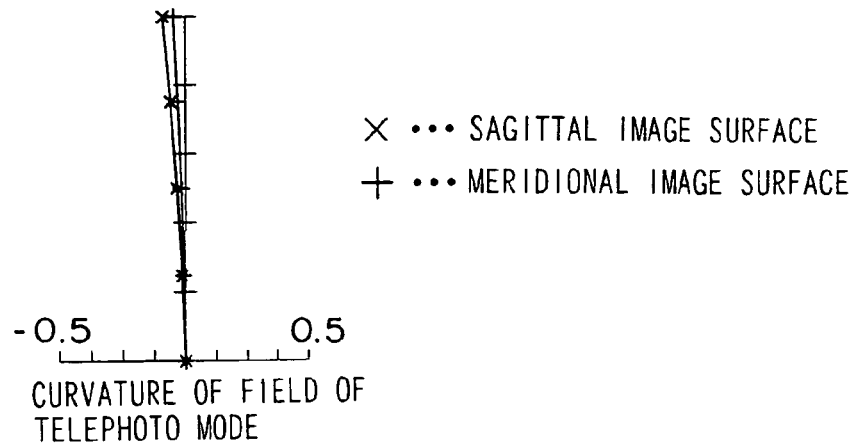

In the case where CCD 2 is in a plane state without changing the curvature of CCD 2, as shown in FIGS. 24A to 24C, the wide-angle mode shows large curvature of field at a peripheral portion of the image, and the close-in mode shows the further larger curvature of field and image distortion becomes larger.

In the digital camera 100, when the size of CCD is a quarter inch and the first lens 102A and the second lens 102B are located in the positional relationship of the wide-angle mode, as shown in FIG. 22A, the driving circuit 172 controls the actuator portion 4 in order to curve CCD 2 so that curvature radius r becomes 14 mm and the amount of movement d of an end periphery from a reference plane which is of the plane when CCD 2 is expanded in the plane becomes 0.12 mm.

In the close-in mode, as shown in FIG. 22B, the driving circuit 172 controls the actuator portion 4 in order to curve CCD 2 so that the curvature radius r becomes 5 mm and the amount of movement d of the end periphery from the reference plane becomes 0.34 mm.

In the telephoto mode, as shown in FIG. 22C, the driving circuit 172 controls the actuator portion 4 in order to curve CCD 2 so that the curvature radius r becomes 34 mm and the amount of movement d of the end periphery from the reference plane becomes 0.05 mm.

The curvature radius r is the smallest in the close-in mode and increased in order of the wide-angle mode and the telephoto mode. The amount of movement d is the largest in the close-in mode and decreased in order of the wide-angle mode and the telephoto mode. Namely, the curvature of CCD 2 is increased in order of the telephoto mode, the wide-angle mode, and the telephoto mode.

Figure 23A:
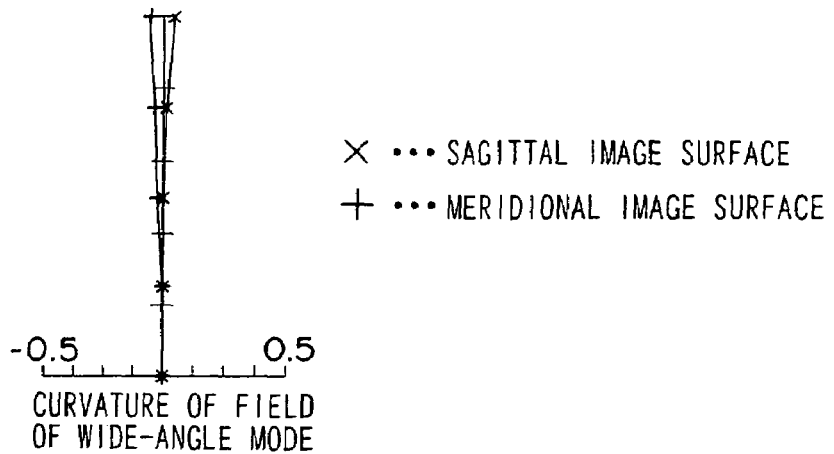
FIGS. 23A to 23C are a graph showing curvature of field in each mode when CCD is curved at the curvatures shown in FIGS. 22A to 22C.
Figure 23B:
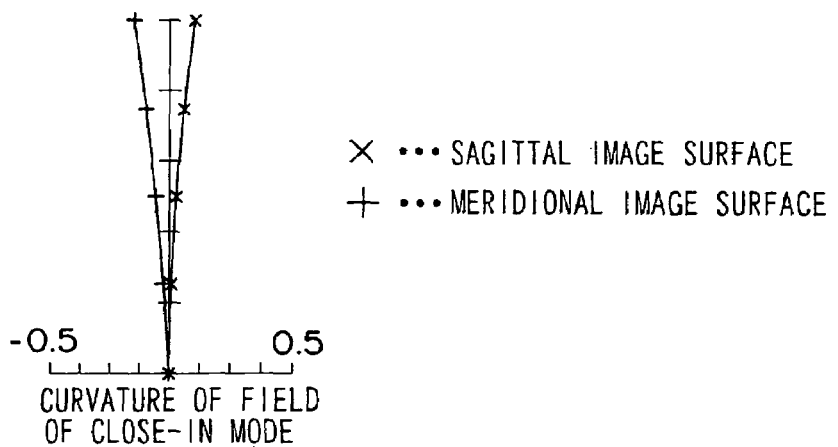
Figure 23C:
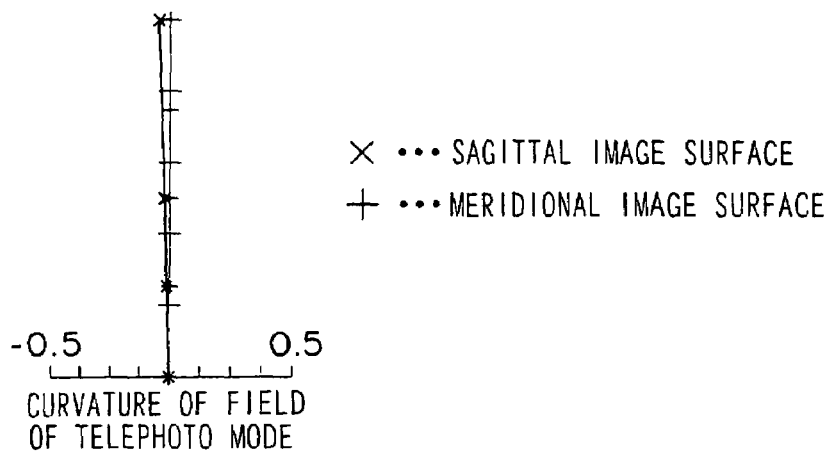

Therefore, as shown in FIGS. 23A to 23C, CCD 2 is curved at the curvature radius according to each of the telephoto mode, the wide-angle mode, and the telephoto mode. As a result, in each of the telephoto mode, the wide-angle mode, and the telephoto mode, the curvature of field can be remarkably decreased, i.e. the image having the little distortion can be obtained.

When CCD 2 is used for the digital camera 100 and the camera-equipped cellular phone 200, without increasing the number of lenses, the image distortion due to the aberration can be suppressed and the shading can be prevented from generating at the end portion of the image. Further, since the curvature of CCD 2 can be changed by the actuator 40, for example, when the normal shooting mode is changed to the close-in mode in the electronic endoscope, the digital camera 100, and the camera-equipped cellular phone 200, the aberration of CCD 2 is corrected and the generation of the image distortion is prevented by changing the curvature of CCD 2 according to the mode. Similarly, when the wide-angle mode is changed to the telephoto mode in the digital camera 100, the camera-equipped cellular phone 200, and the like, the image with no distortion is obtained in the wide angle shooting and the telephoto shooting by changing the curvature of CCD 2.

In the general optical instruments, compared with the telephoto mode which observes or shoots the distance, the image distortion due to the aberration tends to increase in the wide-angle mode which observes and shoots the wide range. The image distortion due to the aberration is remarkable in the end portion of the image. In the digital camera 100 and the camera-equipped cellular phone 200 using the above-described CCD 2, the image distortion due to the aberration in the wide-angle mode is corrected by changing the curvature of CCD 2, so that, in the wide-angle mode and the telephoto mode, the image with no distortion is obtained without using many lenses in the above-described lens unit in order to correct the aberration in the wide-angle mode. Therefore, the good image is obtained even if the low-cost lens in which strict correction of the aberration has not been performed is used.

In the close-in mode (macro) which observes and shoots the nearby subject, the image distortion due to the aberration tends to further increase, compared with the wide-angle mode. In the digital camera 100 and the camera-equipped cellular phone 200 using the above-described CCD 2, the image distortion due to the aberration in the close-in mode (macro) is corrected by changing the curvature of CCD 2 at the third curvature radius smaller than the second curvature radius which is of the curvature radius in the wide-angle mode, so that, in the wide-angle mode, the telephoto mode, and the close-in mode (macro), the image with no distortion is obtained without using many lenses in the photographing lens 102 in order to correct the aberration in the close-in mode (macro).

At this point, it is possible that CCD 2 is curved in a quadric surface such as a cylindrical surface, or it is possible that CCD 2 is curved in a cubic surface such as a spherical surface. It is preferable that CCD 2 is curved in the cubic surface and formed so that the curvature of the cubic surface can be changed, because the image distortion due to the aberration can be corrected with higher accuracy rather than the quadric surface.

However, when the image with the extremely little distortion is not required, by using CCD 2 curved in the quadric surface, since the configurations of the digital camera 100 and the camera-equipped cellular phone 200 and the configuration of the actuator 40 can be largely simplified and the digital camera 100 and the camera-equipped cellular phone 200 can be formed at low cost, it is preferable that CCD 2 is curved in the quadric surface.

In order that CCD 2 is the element having function of converting the optical image into the electric signal and can be curved and expanded by the actuator 40, it is preferable to use the substrate having such form as the plate, the sheet, the film, and the thin film. Specifically, an optical sensor such as CCD and CMOS and a TFT circuit in which the optical sensor, the memory, and the interface are combined can be cited. The solid-state image pickup element in which various elements are formed on the silicon substrate, the metal substrate, the plastic substrate, or the glass thin film has the high flexibility, so that solid-state image pickup element is preferable to the flexible substrate 2C.

As described later, the electric field curving actuator, the mechanical actuator, an internal pressure type actuator, and the temperature-sensitive type actuator can be cited as the actuator 40, the invention is not limited to the above-described actuators as long as the curvature of CCD 2 can be changed, i.e. CCD 2 can be curved and expanded.

As described above, the digital camera and the camera-equipped cellular phone were described. The solid-state image pickup device of the invention can be used for any optical instrument which the optical image is temporarily converted into the electric signal by the solid-state image pickup device and the processing of the electric signal is performed by the computer to display the image if necessary. The electronic endoscope, the astronomical telescope, the digital camera, the camera-equipped cellular phone, and a digital video camera can be specifically cited.

Although the digital camera and the camera-equipped cellular phone including one solid-state image pickup element (CCD 2) were described as an example in the above-described embodiment, needless to say, it is possible that the digital camera and the camera-equipped cellular phone include the plurality of solid-state image pickup elements.

Further, instead of CCD, CMOS and the like can be obviously used as the solid-state image pickup element.

OTHER EXAMPLES OF ACTUATOR

Other examples of the actuator portion used for the digital camera 100 and the camera-equipped cellular phone 200 will be described below.

(1) Example 1

Figure 12A:
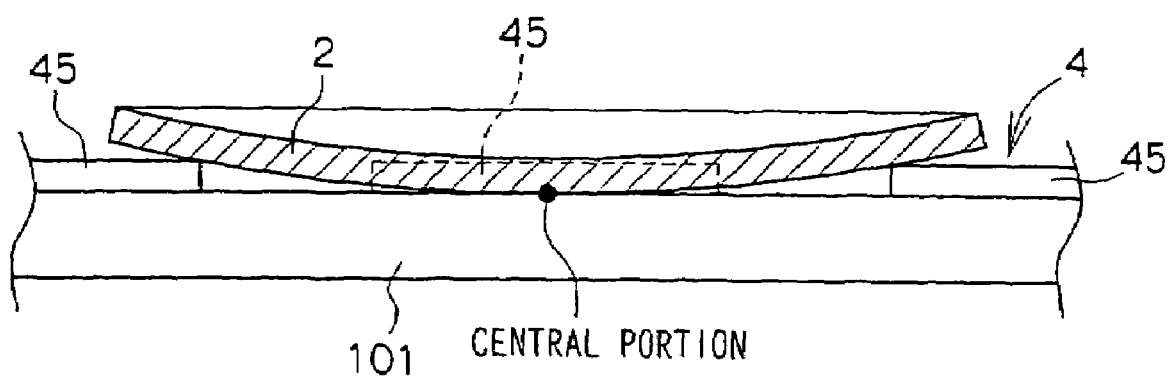
FIGS. 12A and 12B are a side view showing the configuration of the actuator portion of Example 1 which is of another example of the actuator portion in the digital camera and the camera-equipped cellular phone.
Figure 12B:
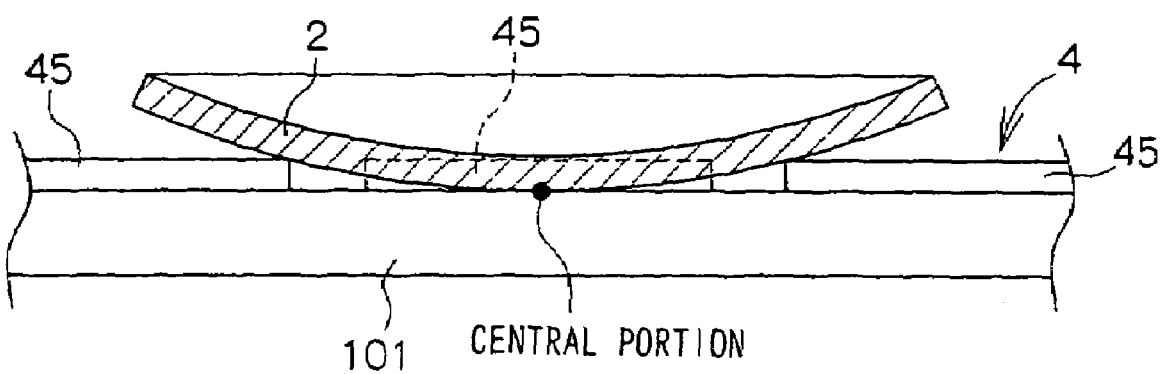

FIGS. 12A, 12B, and 13 show another example of the actuator 40 which can be mounted on the digital camera 100 and the camera-equipped cellular phone 200. The actuator is also an example of the mechanical actuator of the invention.

In the digital camera 100 and the camera-equipped cellular phone 200, the mechanical actuator is extremely easy to interlock with the lever or the button changing between the wide-angle shooting and the telephoto shooting, and the complicated electric circuit is not required, so that the mechanical actuator can be formed at low cost.

Therefore, the expensive electric circuit for changing the curvature of CCD 2 is not also required in the digital camera 100 and the camera-equipped cellular phone 200, so that the digital camera 100 and the camera-equipped cellular phone 200 can be formed at low cost. The electric power for actuating the electric circuit is not required, so that the electric power can be saved. Accordingly, in the case where a primary battery or a secondary battery is used as the power supply of the electric power, the mechanical actuator has the advantage that battery life can be lengthened by the saving of the electric power for actuating the electric circuit.

In the example shown in FIGS. 12A, 12B, and 13, CCD 2 is fixed to the chassis 101 in the central portion indicated by a black circle while gently curved in the spherical surface toward the light incident side, and actuator portion 4 includes four plate-shaped members 45 which are inserted between CCD 2 and the chassis 101 along the direction toward the central portion of CCD 2 and the actuator (not shown) which moves the plate-shaped members 45 in the direction toward the central portion of CCD 2 or in the direction retreating from the central portion.

As shown in FIG. 12B, when the plate-shaped members 45 are moved toward the central portion of CCD 2, CCD 2 is curved at the larger curvature, i.e. the curvature radius becomes smaller. On the other hand, when the plate-shaped members 45 are moved in the direction retreating from the central portion of CCD 2, since CCD 2 is expanded by the elastic force of itself, the curvature of CCD 2 becomes smaller, i.e. the curvature radius becomes larger.

In the digital camera 100 and the camera-equipped cellular phone 200 on which the actuator 4 shown in FIGS. 12a and 12B is mounted, the curvature of CCD 2 is increased or decreased by moving the plate-shaped members according to each of the wide-angle mode, the telephoto mode, and the close-in mode set by the shooting/reproducing selection switch 124 or the shooting mode selection dial 126 or according to the relatively positional relationship between the first lens 102A and the second lens 102B corresponding to each shooting mode.

(2) Example 2

FIG. 14 shows another example of the mechanical actuator which can be mounted on the digital camera 100 and the camera-equipped cellular phone 200.

In the example shown in FIG. 14, CCD 2 is formed in the plane while fixed to the chassis 101 in the central portion through the CCD fixing member 42, and actuator portion 4 includes the CCD fixing member 42, a pair of or two pairs of wedge-shaped members 46 which are inserted between CCD 2 and the chassis 101 along the direction toward the central portion of CCD 2, and the actuator (not shown) which moves the wedge-shaped members 46 in the direction toward the central portion of CCD 2 or in the direction retreating from the central portion.

CCD 2 is arranged so that a gap is made between the chassis 101 and the CCD 2.

In the example of FIG. 14, as indicated by the chain double-dashed line, when the wedge-shaped members 46 are moved toward the central portion of CCD 2, the peripheral portion of CCD 2 is raised by the wedge-shaped members 46 and the distance between the chassis 101 and the peripheral portion of CCD 2 becomes larger, so that the curvature of CCD 2 also becomes larger. When the wedge-shaped members 46 are moved in the direction retreating from the central portion of CCD 2, as shown by the solid line, since a thickness of the wedge-shaped member 46 located between CCD 2 and the chassis 101 becomes smaller, CCD 2 returns to the plane by the elastic force of itself and the distance between the chassis 101 and the peripheral portion of CCD 2 becomes smaller. Therefore, the curvature of CCD 2 becomes smaller.

In the actuator 4 shown in FIG. 14, the curvature of CCD 2 is increased or decreased by moving the wedge-shaped members according to each of the wide-angle mode, the telephoto mode, and the close-in mode set by the shooting/reproducing selection switch 124 or the shooting mode selection dial 126 included in the digital camera 100 and the camera-equipped cellular phone 200 or according to the relatively positional relationship between the first lens 102A and the second lens 102B corresponding to each shooting mode.

(3) Example 3

Figure 15:
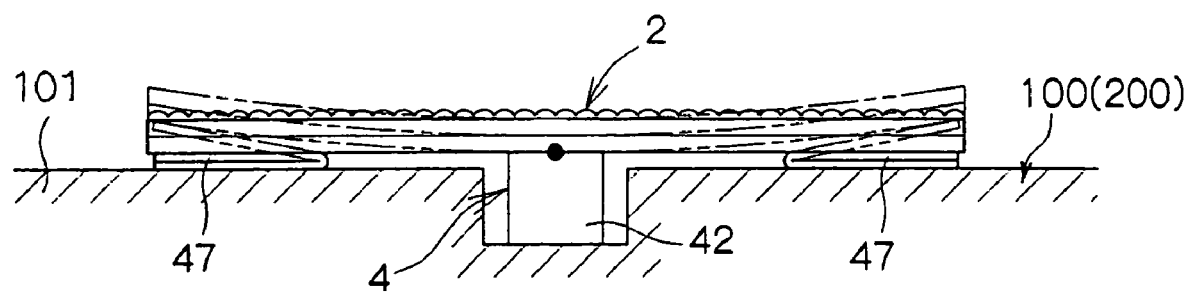
FIG. 15 is a side view showing the configuration of the actuator portion of Example 3 including a temperature-sensitive type actuator.

FIG. 15 shows still another example of the mechanical actuator which can be mounted on the digital camera 100 and the camera-equipped cellular phone 200.

The actuator shown in FIG. 15 is an example of the temperature-sensitive type actuator of the invention, and the actuator shown in FIG. 15 has the same configuration as the example shown in FIG. 14 except that the wedge-shaped member 46 in the actuator shown in FIG. 14 is replaced by a V-shaped actuator 47 made of the shape memory alloy plate. The V-shaped actuators 47 are arranged so that the side opened in the V-shape faces the outside. The V-shaped actuator 47 is closed when heated, and the V-shaped actuator 47 is opened when cooled. The V-shaped actuator is heated by the direct passage of the current through the V-shaped actuator 47.

In the actuator 4 shown in FIG. 15, the V-shaped actuator 47 is closed as shown by the solid line when the V-shaped actuator 47 is heated by the passage of the current through the V-shaped actuator 47, so that CCD 2 returns to the plane by the elastic force of itself. Therefore, the curvature of CCD 2 becomes smaller. When the passage of the current is cut to cool the V-shaped actuator 47, since the V-shaped actuator 47 is opened as shown by the chain double-dashed line, the peripheral portion of CCD 2 is raised from the chassis 101. Therefore, the curvature of CCD 2 becomes larger.

In the actuator 4 shown in FIG. 15, the curvature of CCD 2 is increased or decreased by changing an opening degree in such a manner that the temperature is raised and lowered by controlling the magnitude of the current passing through the V-shaped actuator 47 according to each of the wide-angle mode, the telephoto mode, and the close-in mode set by the shooting/reproducing selection switch 124 or the shooting mode selection dial 126 included in the digital camera 100 and the camera-equipped cellular phone 200 or according to the relatively positional relationship between the first lens 102A and the second lens 102B corresponding to each shooting mode.

(4) Example 4

Figure 16:
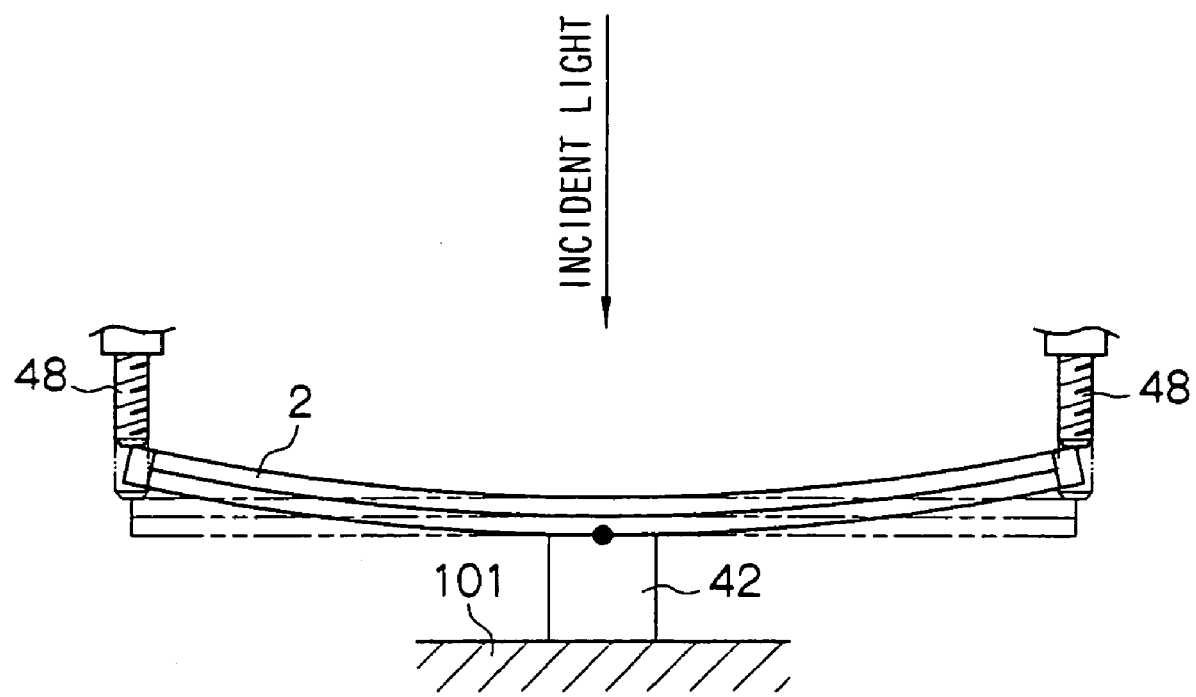
FIG. 16 is a side view showing the configuration of the actuator portion of Example 4 including a mechanical actuator.

FIG. 16 shows still another example of the mechanical actuator which can be mounted on the digital camera 100 and the camera-equipped cellular phone 200.

In the example shown in FIG. 16, CCD 2 is previously curved in the cylindrical surface or the spherical surface toward the light incident direction, CCD 2 is fixed to the chassis 101 in the central portion by the CCD fixing member 42, and the screws 48 pressing the four corner portions of CCD 2 are provided.

As shown by the chain double-dashed line in FIG. 16, when the screw 48 heads down toward CCD 2 by rotating the screw in a clockwise direction viewed from the light incident direction, since the peripheral portion of CCD 2 is pressed toward the chassis 101 against the elastic force of itself, the curvature of CCD 2 becomes smaller.

In the case where the curvature of CCD 2 is increased, as shown by the solid line in FIG. 16, the curvature of CCD 2 is increased by the elastic force of the CCD 2 in such a manner that the screw 48 is retreated by rotating the screw in a counterclockwise direction viewed from the light incident direction.

(5) Example 5

Figure 17:
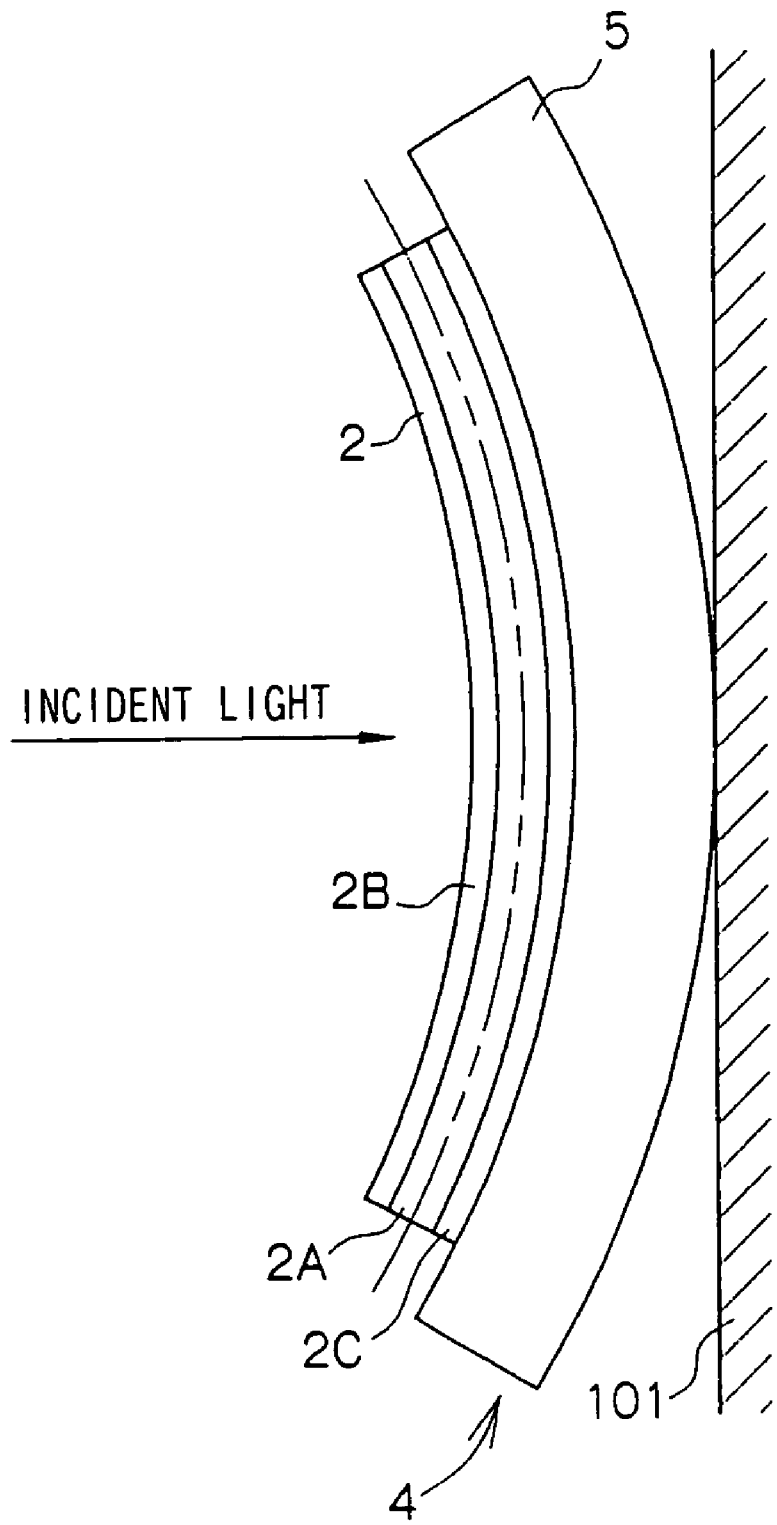
FIG. 17 is a side view showing the configuration of the actuator portion of Example 5 including an electric field curving actuator.

FIG. 17 shows an example of the electric field curving actuator which can be mounted on the digital camera 100 and the camera-equipped cellular phone 200.

The electric field curving actuator can perform the curvature and the expansion only by changing the magnitude of the applied voltage, i.e. the electric field curving actuator can increase or decrease the degree of the curvature and perform the expansion and the compression only by changing the magnitude of the applied voltage. Therefore, when the movement of the electric field curving actuator is transmitted to CCD 2 to curve and expand CCD 2 by a means of bonding the electric field curving actuator to the backside of CCD 2, the curvature of CCD 2 can be changed.

Because no mechanical mechanism is used in order to change the curvature of CCD 2, CCD 2 and the mechanism near CCD 2 can be compactly formed. Further, because no mechanical mechanism is used, the mechanical trouble hardly occurs.

An ionic conduction actuator and the conductive polymer actuator can be cited as an example of the electric field curving actuator.

In the example shown in FIG. 17, the actuator 4 includes the ionic conduction actuator 5 in which one of surfaces is bonded to the flexible substrate 2C of CCD 2 and the other surface is bonded to the chassis 101 in the central portion.

As shown in FIG. 18, the ionic conduction actuator 5 includes an ionic conduction polymer sheet 50, a positive electrode 52A laminated on one of surfaces of the ionic conduction polymer sheet 50, and a negative electrode 52B laminated on the other surface of the ionic conduction polymer sheet 50.

The ionic conduction polymer sheet 50 is the sheet made of an anion type hydrous polyelectrolyte. A negative ion is located in a side chain of the polyelectrolyte molecule and a positive ion in contained as a pair ion of the negative ion.

When the voltage is not applied to both the positive electrode 52A and the negative electrode 52B as shown on the left side of FIG. 18, the ionic conduction polymer sheet 50 is in the plate shape. When the voltage is applied to both the positive electrode 52A and the negative electrode 52B as shown on the right side of FIG. 18, the negative ion in the ionic conduction polymer sheet 50 is attracted to the positive electrode 52A and the positive ion is attracted to the negative electrode 52B. However, the negative ion can not be moved through the ionic conduction polymer sheet 50 because the negative ion is located in the side chain of the polyelectrolyte. Therefore, the positive ion is moved toward the negative electrode 52B. At this point, the positive ion is moved toward the negative electrode 52B while attracting a surrounding water molecule. As shown on the right side of FIG. 18, a volume of the negative electrode 52B side of the ionic conduction polymer sheet 50 is increased by the moved positive ions and water molecules, and the ionic conduction polymer sheet 50 is curved so that the surface on the positive electrode 52A becomes the inside.

Therefore, when CCD 2 is bonded to the surface on the side where the positive electrode 52A is provided in the ionic conduction actuator 5 and the surface on the side where the negative electrode 52B is provided is bonded to the chassis 101, as shown in FIG. 17, CCD 2 can be curved toward the light incident direction only by applying the voltage to the positive electrode 52A and the negative electrode 52B.

In the ionic conduction actuator 5, it is possible that a conductive polymer sheet 54 is used instead of the ionic conduction polymer sheet 50. FIGS. 19A and 19B show the configuration of the ionic conduction actuator 5 using the conductive polymer sheet 54. The ionic conduction actuator 5 using the conductive polymer sheet 54 is also referred to as the conductive polymer actuator.

The ionic conduction actuator 5 shown in FIGS. 19A and 19B includes the conductive polymer sheet 54, the positive 52A laminated on one of surfaces of the conductive polymer sheet 54, and the negative electrode 52B laminated on the other surface of the conductive polymer sheet 54.

The conductive polymer sheet 54 is one in which the polyelectrolyte sheet made of a cation type polyelectrolyte is hydrated and the negative ion is doped.

When the voltage is applied to neither the positive electrode 52A nor the negative electrode 52B as shown on the left side of FIG. 18, the ionic conduction polymer sheet 54 is in the plate shape. When the voltage is applied to both the positive electrode 52A and the negative electrode 52B as shown on the right side of FIG. 18, the negative ion in the ionic conduction polymer sheet 54 is attracted to the positive electrode 52A and the positive ion is attracted to the negative electrode 52B. However, the positive ion can not be moved through the conductive polymer sheet 54 because the positive ion is fixed to the side chain of the cation type polyelectrolyte. Therefore, only the doped negative ion and the water molecule are transferred to the positive electrode 52A side, so that the volume of the positive electrode 52A side of the conductive polymer sheet 54 is increased by the positive ions and water molecules moved from the negative electrode 52B side of the conductive polymer sheet 54. On the contrary, the volume of the negative electrode 52B side of the conductive polymer sheet 54 is decreased by detachment of the negative ions and water molecules. As a result, the conductive polymer sheet 54 is curved toward the negative electrode 52B side.

Therefore, when CCD 2 is bonded to the surface on the side where the negative electrode 52B is provided in the ionic conduction actuator 5 and the surface on the side, where the positive electrode 52A is provided, is bonded to the chassis 101, as shown in FIG. 17, CCD 2 can be curved toward the light incident direction only by applying the voltage to the positive electrode 52A and the negative electrode 52B.

(6) Example 6

Figure 20A:
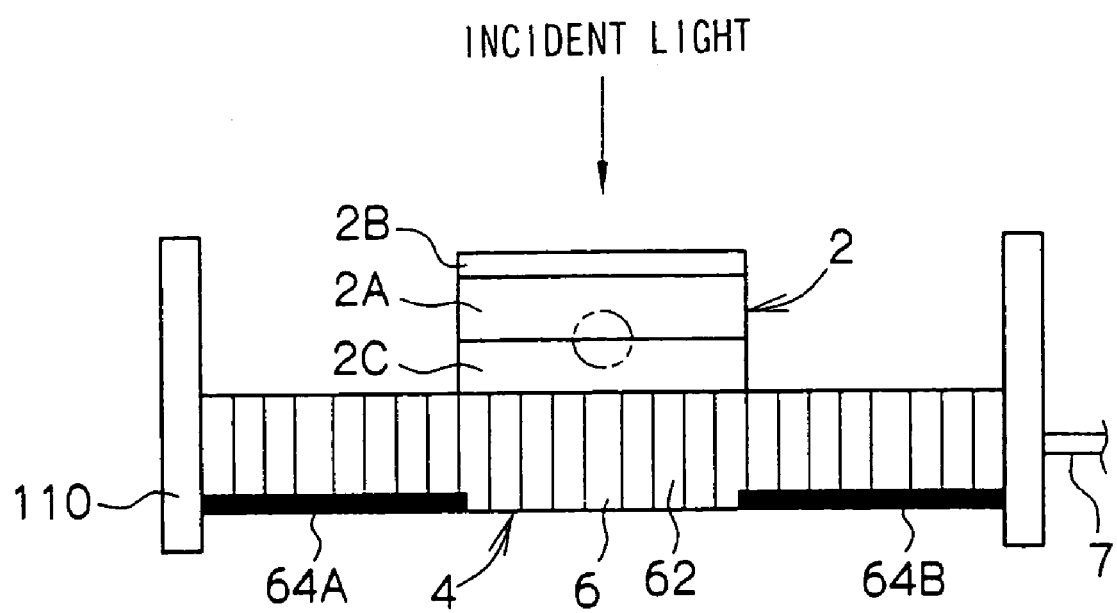
FIGS. 20A and 20B are a side view showing the configuration of the actuator portion of Example 6 including an internal pressure type actuator.
Figure 20B:
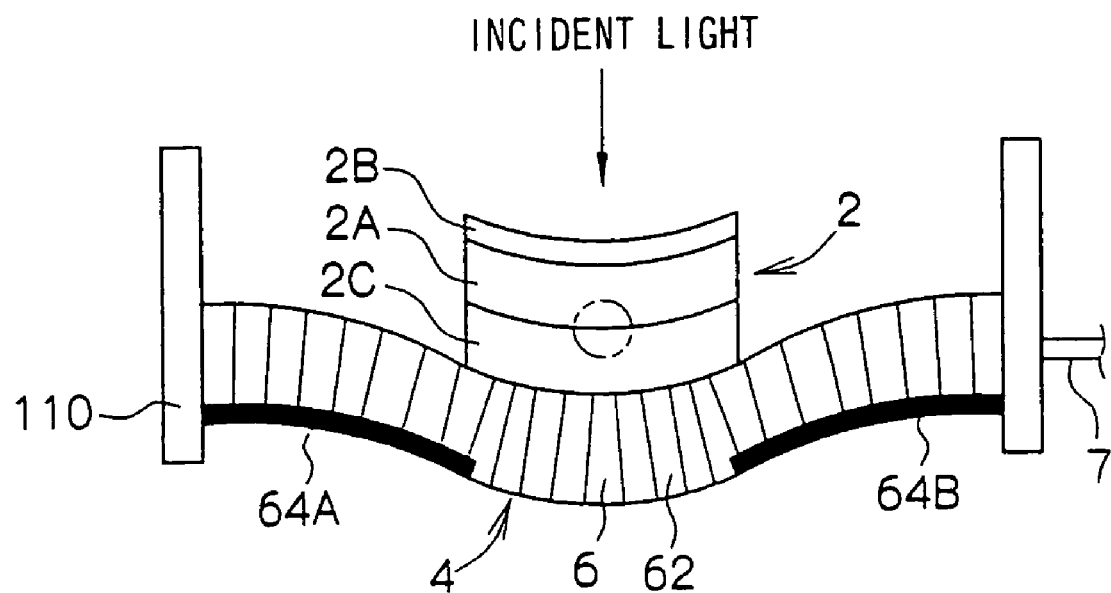

FIGS. 20A and 20B show an example of the internal pressure type actuator which can be mounted on the digital camera 100 and the camera-equipped cellular phone 200.

When CCD 2 is fixed to a part of the internal pressure type actuator where the curvature and the expansion are performed as shown in FIGS. 20A and 20B, the mechanism which transmits the movement of the internal pressure type actuator to CCD 2 is not required. Further, the member such as a syringe which injects air or a fluid such as water into the internal pressure type actuator and evacuates the air or the fluid from the internal pressure type actuator is provided, and the syringe is interlocked with the lever or the button which changes between the wide-angle mode and the telephoto mode. This enables the curvature of CCD 2 to be controlled without the complicated electronic circuit. Therefore, the digital camera 100 and the camera-equipped cellular phone 200 can be formed at lower cost by using CCD 2 with the internal pressure type actuator. Because the internal pressure type actuator can control the degree of the curvature in a stepless manner by changing the pressure of the internal fluid, CCD 2 can be curved at the curvature radius most suitable for the shooting condition.

In the example shown in FIGS. 20A and 20B, the actuator portion 4 includes a pipe-shaped actuator 6 whose both ends are fixed to the chassis 101 and an air pipe conduit 7 which supplies the air to the pipe-shaped actuator 6.

The pipe-shaped actuator 6 is reinforced by circumferential reinforcement fiber 62 in which reinforcement fiber is wound along the substantially circumferential direction of a soft tube and axis reinforcement fiber 64A and axis reinforcement fiber 64B which are the reinforcement fiber arranged along the axial direction of the tube. The axis reinforcement fiber 64B is provided on extension of the axis reinforcement fiber 64A. The pipe-shaped actuator 6 is arranged so that the axis reinforcement fiber 64A and the axis reinforcement fiber 64B face the side opposite to the light incident side. The flexible substrate of CCD 2 is bonded to the side opposite to the side where the axis reinforcement fiber 64A and the axis reinforcement fiber 64B are arranged, and the flexible substrate is bonded to the central portion of the pipe-shaped actuator 6.

In the state in which the air is not supplied to the pipe-shaped actuator 6, the pipe-shaped actuator 6 is in line as shown in FIG. 20A. When the air is supplied to the pipe-shaped actuator 6 from the air pipe conduit 7, although the pipe-shaped actuator 6 is expanded toward the outside, the expansion is controlled by the circumferential reinforcement fiber 62. Therefore, the pipe-shaped actuator 6 is expanded by the pressure of the supplied air. However, on the side opposite to the light incident side in both end portions, the deformation expanding in the axial direction is also controlled by the axis reinforcement fiber 64A and the axis reinforcement fiber 64B. Consequently, as shown in FIG. 20B, the both end portions of the pipe-shaped actuator 6 are curved toward the side where the axis reinforcement fiber 64A and the axis reinforcement fiber 64B are provided. On the other hand, because the deformation expanding in the axial direction is not controlled in the central portion of the pipe-shaped actuator 6, the central portion of the pipe-shaped actuator 6 is curved toward the light incident direction opposite to the direction in which the both end portions are curved so as to smoothly connect to the both end portions. Accordingly, the pipe-shaped actuator 6 is curved in a reverse Ω-shape as a whole, and CCD 2 is also curved toward the light incident direction. It is also possible that the syringe is connected to the pipe-shaped actuator 6 instead of the air pipe conduit 7 and pressurization is performed by supplying the air or the fluid such as the water, silicone oil, and glycerin with the syringe to curve the pipe-shaped actuator 6.

(7) Example 7

Figure 21A:
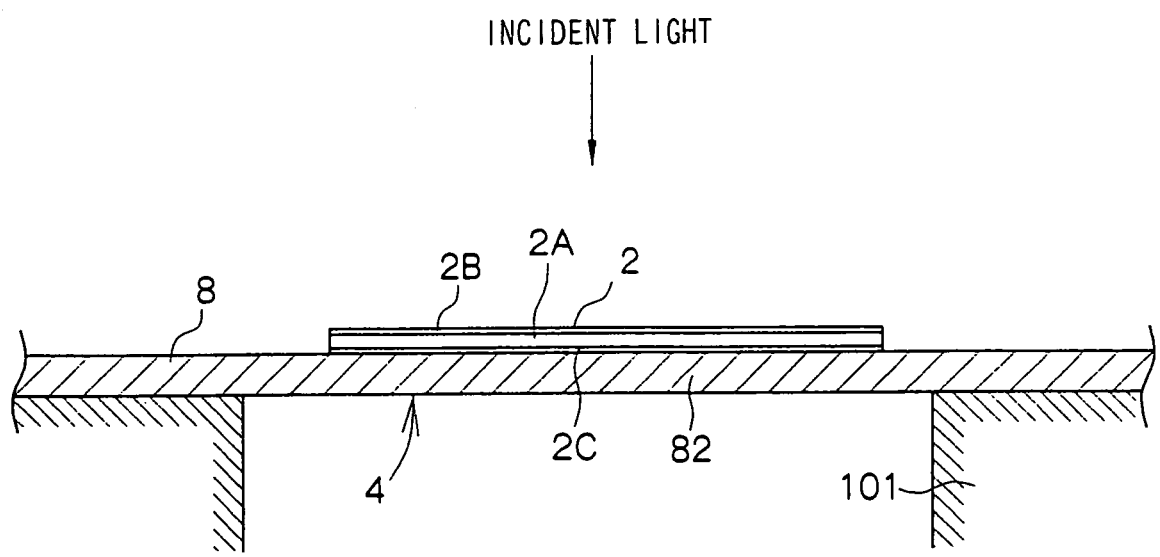
FIGS. 21A and 21B are a side view showing the configuration of the actuator portion of Example 7 including the temperature-sensitive type actuator.
Figure 21B:
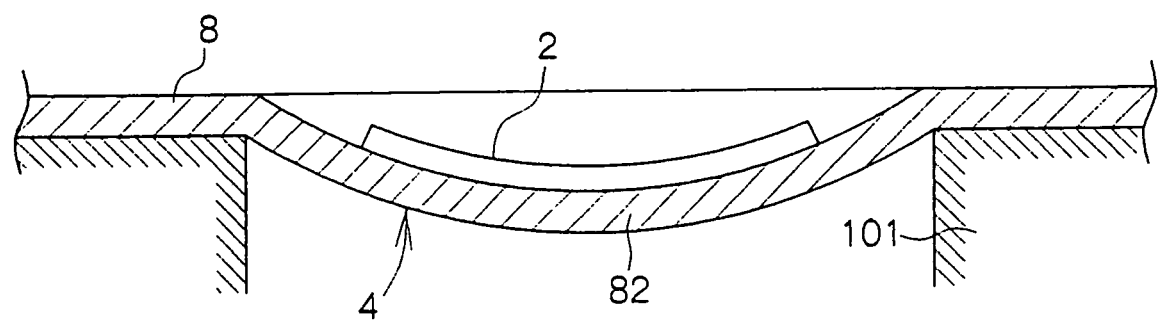

FIGS. 21A and 21B show an example of the temperature-sensitive actuator which can be mounted on the digital camera 100 and the camera-equipped cellular phone 200.

In the example shown in FIGS. 21A and 21B, a diaphragm type actuator 8 is used as the actuator portion 4.

The diaphragm type actuator 8 is made of the shape memory alloy, and spherical concave depression 82 is formed in the diaphragm type actuator 8. The diaphragm type actuator 8 is fixed to the chassis 101 so that the concave depression 82 faces the light incident side.

The flexible substrate 2C of CCD 2 is bonded to the inside of the concave depression 82.

Further, the concave depression 82 is formed to be able to be heated by the passage of the current through the concave depression 82.

In the state in which the concave depression 82 is heated by the passage of the current, the diaphragm type actuator 8 is in plane as shown in FIG. 21A. When the diaphragm type actuator 8 is cooled to around room temperature by the cut of the passage of the current, the diaphragm type actuator 8 is depressed in the spherical shape as shown in FIG. 21B. Accordingly, CCD 2 is also curved in the spherical shape.

The degree of the depression of the concave depression 82 can be controlled in such a manner that the temperature of the concave depression 82 is controlled by controlling the passage of the current through the concave depression 82 according to each of the wide-angle mode, the telephoto mode, and the close-in mode in the digital camera or according to the relatively positional relationship between the first lens 102A and the second lens 102B corresponding to each shooting mode, so that the curvature of CCD 2 can be also controlled.

Second Embodiment

Another example used for the digital camera 100 and the camera-equipped cellular phone 200 will be described below.

Figure 25:
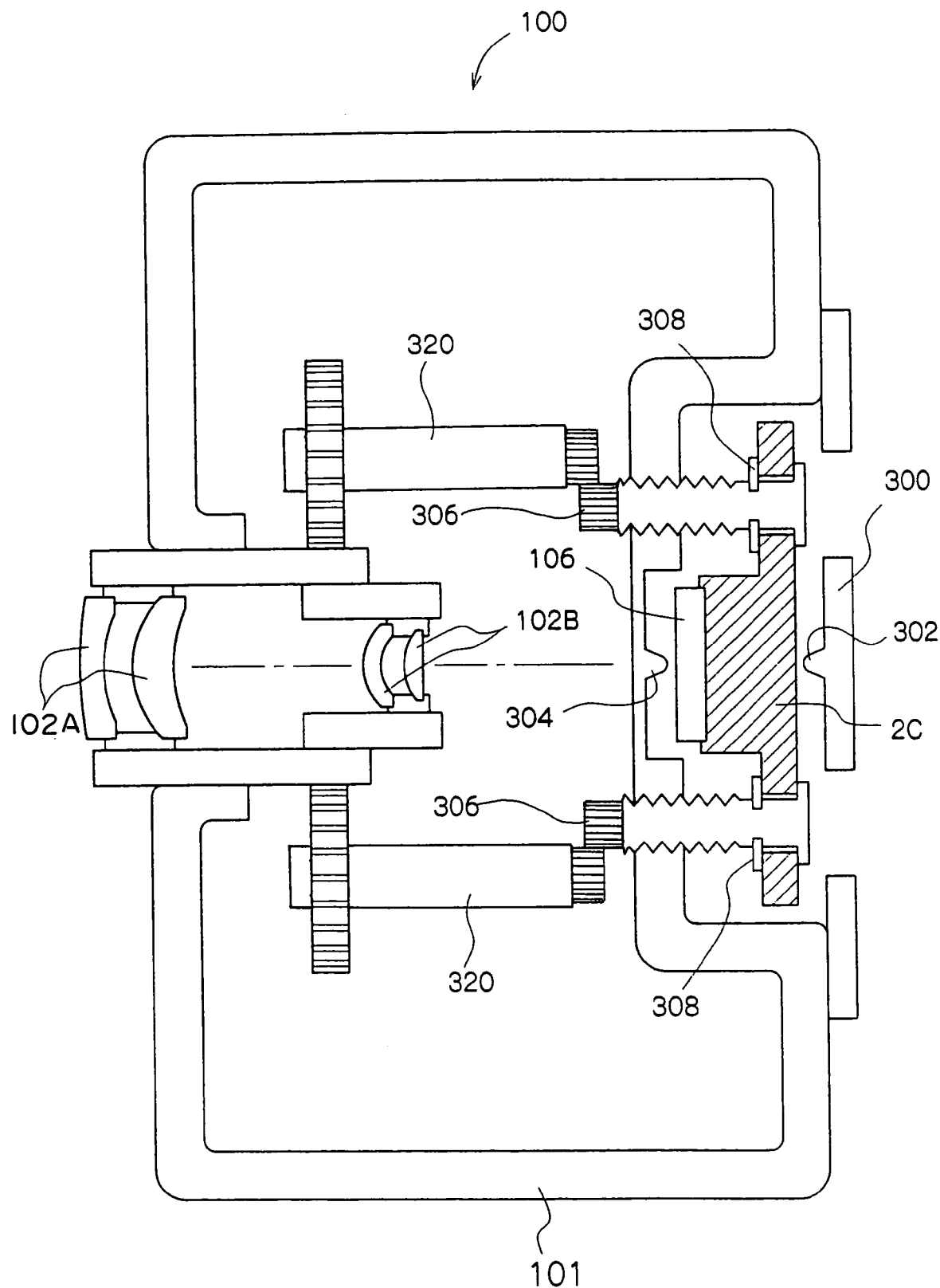
FIG. 25 is a sectional view showing the configuration including a positioning screw.

As shown in FIG. 25, the digital camera 100 (or camera-equipped cellular phone 200) includes the photographing lenses 102A and 102B and the CCD image pickup unit 106.

The embodiment shown in FIG. 25 is equal to the above-described embodiments in that CCD image pickup unit 106 is provided on the flexible substrate 2C and the curvature of the CCD image pickup unit 106 is changed by a curvature changing portion to obtain the good shooting image. However, the embodiment shown in FIG. 25 has the simpler, lower-cost configuration by using a positioning screw 306 instead of the actuator.

The flexible substrate 2C held to the chassis 101 by the positioning screw 306 is movable in the optical axis direction by the rotation of the positioning screw 306. The zoom position of the photographing lenses 102A and 102B, i.e. each of the telephoto mode, wide-angle mode, and the close-in mode is transmitted through the positioning screw 306 by the zoom interlock unit 320.

As shown in FIG. 25, it is possible that the zoom interlock unit 320 has the method in which the movement of the photographing lenses 102A and 102B is mechanically transmitted to the positioning screw 306 by using a gear or a belt. Alternatively, it is possible to electrically interlock the photographing lenses 102A and 102B and the positioning screw 306 by combining a micro switch and a stepping motor.

Figure 26:
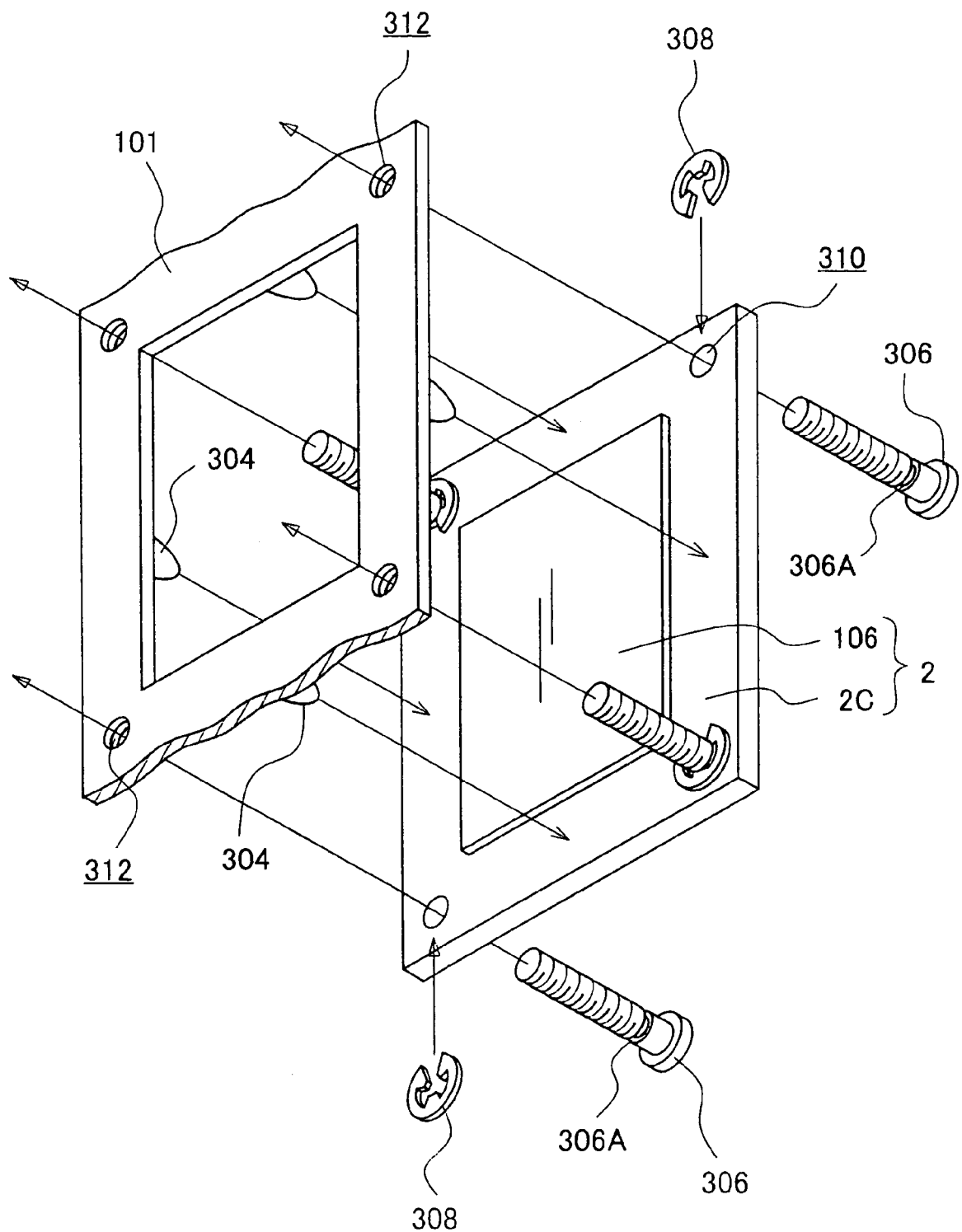
FIG. 26 is a perspective view showing the configuration including a positioning screw.

As shown in FIG. 26, while the positioning screw 306 is rotatably held in the rotational direction relative to the flexible substrate 2C by a free hole 310, a small diameter portion 306A of the positioning screw 306 is fixed in the axial direction (thrust direction, i.e. optical axis direction in this case) by an E ring 308, so that the flexible substrate 2C can be moved in the optical axis direction by rotating the positioning screw 306 engaging a screw hole 312 provided in the chassis 101.

When the flexible substrate 2C is caused to be close to the photographing lens 102 by screwing the positioning screw 306, as shown in FIG. 26, the flexible substrate 2C abuts on projections 304 provided on the chassis 101 and the flexible substrate 2C is no more moved. At this point, when the positioning screw 306 is further screwed, only corner portions of the CCD image pickup unit 106 near the free holes 310 are pulled by the positioning screw 306 and curved toward the side of the photographing lens 102. Namely, the CCD image pickup unit 106 becomes the substantially spherical concave surface, and the CCD image pickup unit 106 becomes the shape close to the actual focal plane, so that the shooting image quality can be improved.

At this point, when a limit of the bending quantity, i.e. the limit of the curvature is within a breaking limit of the flexible substrate 2C, since the limit of the curvature is determined by a height of the projection 304, i.e. a recess quantity of the flexible substrate 2C, it is necessary to form the sufficiently large height of the projection 304 relative to the thickness of the flexible substrate 2C.

On the contrary, when the flexible substrate 2C is separated from the chassis 101 by warming the positioning screw 306, a position corresponding to the backside of the CCD image pickup unit 106 approaches a pressure plate 300 shown in FIG. 25.

The pressure plate 300 is fixed to the chassis 101, and a projection 302 is provided in the center on the backside of the CCD image pickup unit 106. Therefore, when the flexible substrate 2C approaches the pressure plate 300 by the rotation of the positioning screw 306, the backside of the flexible substrate 2C abuts on projection 302 and the flexible substrate 2C is no more moved. At this point, when the positioning screw 306 is further released, only corner portions of the CCD image pickup unit 106 near the free holes 310 are pulled by the positioning screw 306 and curved toward the side of the pressure plate 300. Namely, the CCD image pickup unit 106 becomes the substantially spherical convex surface, and the focal plane can be corrected if necessary. At this point, when the limit of the bending quantity, i.e. the limit of the curvature is within the breaking limit of the flexible substrate 2C, the limit of the curvature is determined by the height of the projection 302, i.e. the recess quantity of the flexible substrate 2C.

In addition to the curvature of the surface of the CCD image pickup unit 106 in the above-described way, for example, in the case where the optical axis of the photographing lens 102 is not perpendicular to the surface of the CCD image pickup unit 106, the inclination of the CCD image pickup unit 106 can be corrected so as to be perpendicular to the optical axis by inclining the flexible substrate 2C.

In the digital camera 100 having the above-described configuration, when the imaging surface of the CCD 2 is inclined or the curvature of field is corrected on CCD 2 side due to the large curvature of field at an adjusting step in shipment, the inclination of the imaging surface and the curvature of field which could not be adjusted by such the conventional method that a space is inserted between CCD 2 and the chassis 101 can be finely adjusted, and man-hour required for the adjustment can be also largely decreased.

When the telephoto mode is changed to the wide-angle mode by changing the distance of the group of photographing lenses, the curvature of CCD 2 is increased according to zoom information transmitted from the zoom interlock unit 320 to the positioning screw 306. On the other hand, when the wide-angle mode is changed to the telephoto mode by changing the distance of the group of photographing lenses, the curvature of CCD 2 is decreased according to zoom information transmitted from the zoom interlock unit 320 to the positioning screw 306.

When the mode is changed to the close-in mode (macro) by changing the distance of the group of photographing lenses, the curvature of CCD 2 is increased larger than the wide-angle mode to improve the image quality according to zoom information transmitted from the zoom interlock unit 320 to the positioning screw 306.

As described above, in the digital camera 100 and the camera-equipped cellular phone 200, since the zoom operation and the operation of changing the curvature of CCD 2 in the positioning screw 306 are interlocked by the zoom interlock unit 320, CCD 2 is curved at the optimum curvature only by performing the zoom operation, and the good shooting image quality can be obtained.

Although the digital camera and the camera-equipped cellular phone including one solid-state image pickup element (CCD 2) were described as an example in the embodiment, needless to say, it is possible that the digital camera and the camera-equipped cellular phone include the plurality of solid-state image pickup elements.

Further, instead of CCD, CMOS and the like can be obviously used as the solid-state image pickup element.

Third Embodiment

Another example used for the digital camera 100 and the camera-equipped cellular phone 200 will be described below.

Figure 27A:
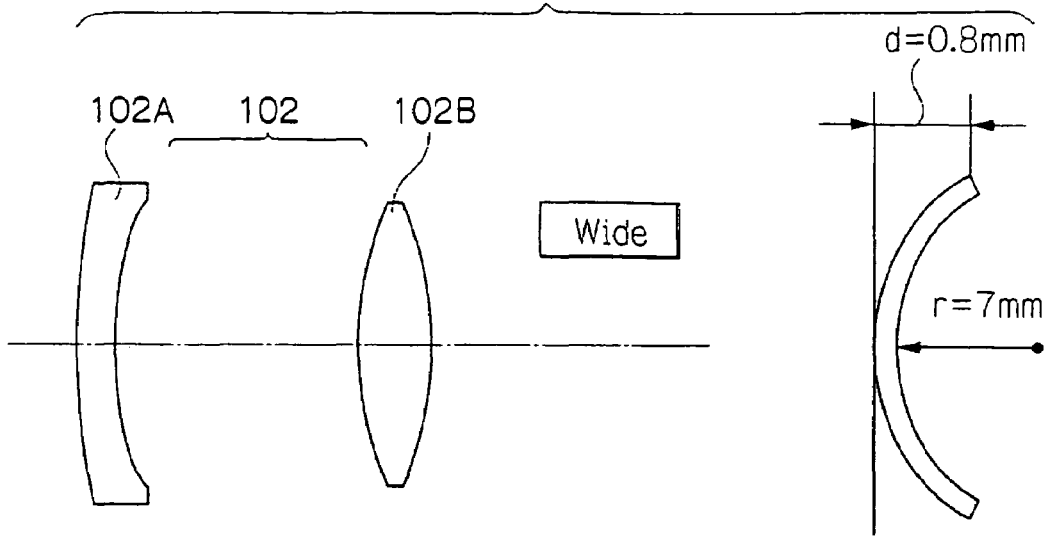
FIGS. 27A to 27C are a schematic view showing the relationship between the mode of the digital camera and the curvature of CCD.
Figure 27B:
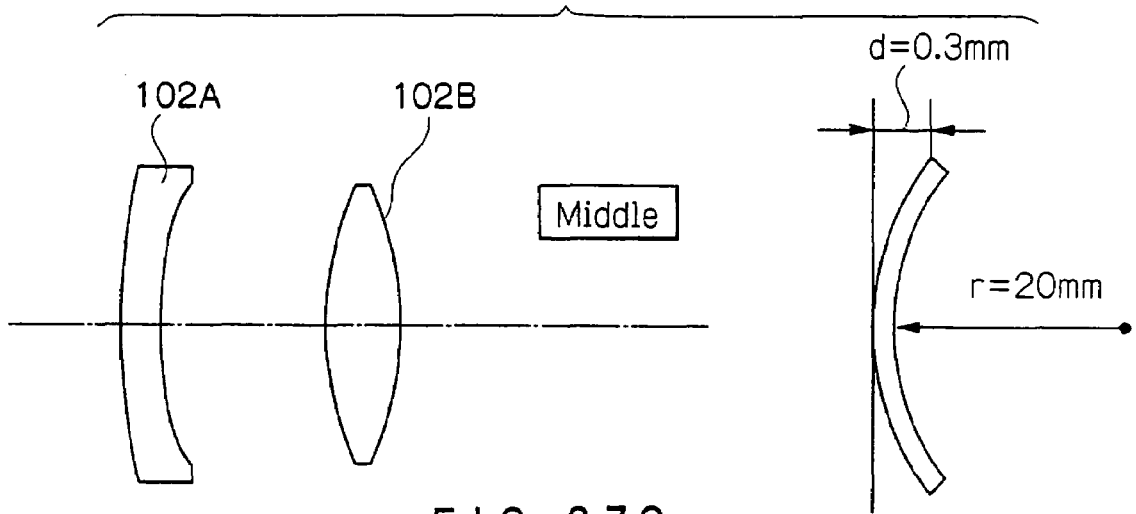
Figure 27C:
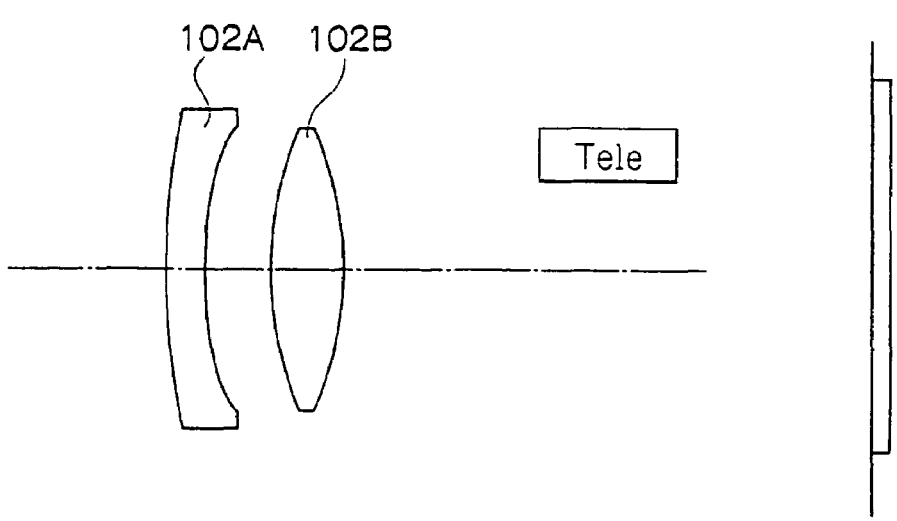

As shown in FIGS. 27A to 27C, the digital camera 100 (or camera-equipped cellular phone 200) includes the photographing lenses 102A and 102B and the CCD image pickup unit 106.

The embodiment shown in FIGS. 27A to 27C is similar to the examples 1-5 using the curvature changing portion such as the positioning screw 306 in that CCD image pickup unit 106 is provided on the flexible substrate 2C and the curvature of the CCD image pickup unit 106 is changed by a curvature changing portion to obtain the good shooting image. However, in the embodiment shown in FIGS. 27A to 27C, particularly the case in which CCD 2 is curved in the concave shape toward the photographing lens 102 will be described.

FIGS. 27A to 27C schematically show the optical system including the photographing lens 102 which is of a two-group zoom lens including the front group 102A having negative refracting power and the rear group 102B having positive refracting power and performing the zoom by changing each distance.

CCD 2 is provided on the imaging surface, and CCD 2 is supported while the curvature of CCD 2 can be changed by, e.g. the curvature changing portion such as the positioning screw 306 shown in the examples 1-5.

FIGS. 27A to 27C show the positions of the front group 102A and the rear group 102B at the wide angle (Wide), an intermediate focal distance (Middle), and the telephoto (Tele) respectively, and the curvature of CCD 2 is changed according to the zoom.

FIG. 28 is a table respectively showing TV distortion and a decrease in ambient light quantity at the wide angle (Wide), the intermediate focal distance (Middle), and the telephoto (Tele) of the photographing lens 102 which is of the two-group zoom lens when CCD 2 is in the plane state.

As can be seen from the table, in the two-group zoom lens having the refracting power from the negative to the positive, the wide angle (Wide) side has the largest negative distortion, and the negative distortion is decreased with the extension of the focal distance in order of the intermediate focal distance (Middle) and the telephoto (Tele). Depending on the optical system, sometimes the telephoto (Tele) side has the positive distortion.

The TV distortion of −2.0% generated in the wide angle (Wide) of FIG. 28 is a numerical value which is not neglected as the photographic image, and the image is distorted in the so-called barrel shape in this state. It is necessary to correct the distortion on software. However, when the amount of correction is large, a new problem such that resolution of the corrected position is degraded is generated.

Therefore, in the embodiment, the TV distortion is improved by curving CCD 2 and the barrel-shaped distortion is corrected without degrading the resolution.

FIG. 29 shows the relationship between the curvature radius (mm) of CCD 2 and the amount (=curvature, mm) in which the end periphery of CCD is moved in the case where the ½.7-inch CCD is used.

Since the wide angle (Wide) has the largest negative distortion (TV distortion) of −2.0%, the curvature of CCD 2 is caused to be the largest of 0.8 mm, and the curvature of CCD 2 is set to be decreased with the extension of the focal distance in order of the intermediate focal distance (Middle) and the telephoto (Tele).

Since the telephoto (Tele) has the TV distortion of 0%, the curvature of CCD 2 is caused to be 0 mm on the telephoto (Tele) side, i.e. CCD 2 becomes the plane.

FIG. 30 shows the TV distortion and the decrease in ambient light quantity at the wide angle (Wide), the intermediate focal distance (Middle), and the telephoto (Tele) when CCD 2 is curved by the amount shown in FIG. 29.

As shown in FIG. 27A, the TV distortion on the wide angle (Wide) side is improved from −2.0% to −0.5% by curving CCD 2 in the convex shape having the curvature radius of 7.0 mm toward the subject side (photographing lens 102 side).

However, the problem that the ambient light quantity is decreased to 51.6% by curving CCD 2 in the convex shape toward the subject side (photographing lens 102 side) is also generated. Although it is also possible that the TV distortion becomes 0% by setting the curvature radius of CCD 2 to 5.5 mm, in this case, the ambient light quantity is further decreased.

In the embodiment, the curvature radius on the wide angle (Wide) side is set to 7.0 mm in consideration of balance between the decrease in ambient light quantity and the correction of the TV distortion.

For the decrease in ambient light quantity, in addition to the correction on the software, it is possible to perform the correction by using the method of inserting the so-called center filter into the optical path. The center filter has optical density in the central portion, and the density is decreased in the radius direction.

The intermediate focal distance (Middle) has the TV distortion as small as −0.4% and the decrease in ambient light quantity is little, so that the TV distortion can be corrected to 0%.

Since the telephoto (Tele) originally has the distortion of 0%, it is not necessary to perform the correction by curving CCD 2. However, depending on the optical system, sometimes it is thought that the positive distortion is generated on the telephoto (Tele) side. In this case, similarly to the embodiment shown in 1-5, the TV distortion can be corrected by curving CCD 2 in the concave shape toward the subject side (photographing lens 102 side).

As described above, it is possible to correct the TV distortion by curving CCD 2. However, the curvature of field, i.e. difference in focus between the central portion of the image and the peripheral portion of the image is also changed by curving CCD 2. Therefore, in the case where CCD 2 is curved in order to correct the TV distortion, it is necessary that the photographing lens 102 is previously designed so that the curvature of field becomes appropriate after curving CCD 2.

The above-described numerical values of the curvature radius of CCD 2 and the like are merely an example, and the numerical values are changed depending on the type of the photographing lens 102.

Fourth Embodiment

Another example used for the digital camera 100 and the camera-equipped cellular phone 200 will be described below.

In the case where the curvature of CCD 2 is changed by using the actuator 40 or the positioning screw 306 and the changed curvature of CCD 2 is left as it is after the shooting is finished, because stress is applied to CCD 2, there is a possibility that CCD 2 is deformed and does not return to the initial state, i.e. to the plane.

It is desirable that the curved state of CCD 2 is released as soon as possible at the time when the shooting is finished and the condition in which the stress is applied to CCD 2 for long hours is avoided.

Therefore, the embodiment includes a release unit which returns the curvature of CCD 2 to the initial state, when the shooting mode is transferred to the condition in which the shooting is not performed after the finish of the shooting, or when the shooting mode is transferred to a stand-by mode for saving electric power consumption after the operation is not performed for a predetermined time.

Specifically, when the power switch is turned off or the mode is transferred to the stand-by mode, it is possible that the control is performed on the software so that the actuator 40 or the positioning screw 306 is automatically returned to the initial state, or it is possible to include the mechanism forcedly returning the curvature changing portion to the initial state by interlocking the operation of the power switch.

The deformation of CCD 2 can be prevented by automatically returning the actuator 40 or the positioning screw 306 to the initial state, i.e. the state in which CCD 2 is not curved so that the curvature of CCD 2 is not changed for a long time by the actuator 40 or the positioning screw 306.

Even if the curvature radius of CCD 2 is curved small and strongly, since the curvature of CCD 2 is limited to a short time, there is no fear that a crack is generated. Therefore, CCD 2 can be strongly curved if necessary.

Even if the curvature radius of CCD 2 is large or CCD 2 is weakly curved, when the load is applied for a long time, there is a possibility that CCD 2 is deformed due to a creeping phenomenon. However, in the embodiment, since the load is limited to a short time, the deformation due to the creeping is not generated and the curvature can be accurately adjusted.

Fifth Embodiment

Another example used for the digital camera 100 and the camera-equipped cellular phone 200 will be described below.

As shown in FIG. 8, CCD 2 has the shape in which a part of the cylindrical surface is cut out. Strictly, as shown in FIG. 31, it is more desirable that CCD 2 is formed in the concave spherical surface along the focal plane of the lens 102. For example, when CCD is used for a Schmidt camera for astronomical shooting instead of the photographic film, the high image quality can be maintained to the peripheral portion of the image by forming the focal distance in the concave spherical surface.

In some cases, it is possible that CCD is approximated by a concave hyperboloid instead of the concave spherical surface.

Sixth Embodiment

Another example used for the digital camera 100 and the camera-equipped cellular phone 200 will be described below.

Figure 32A:
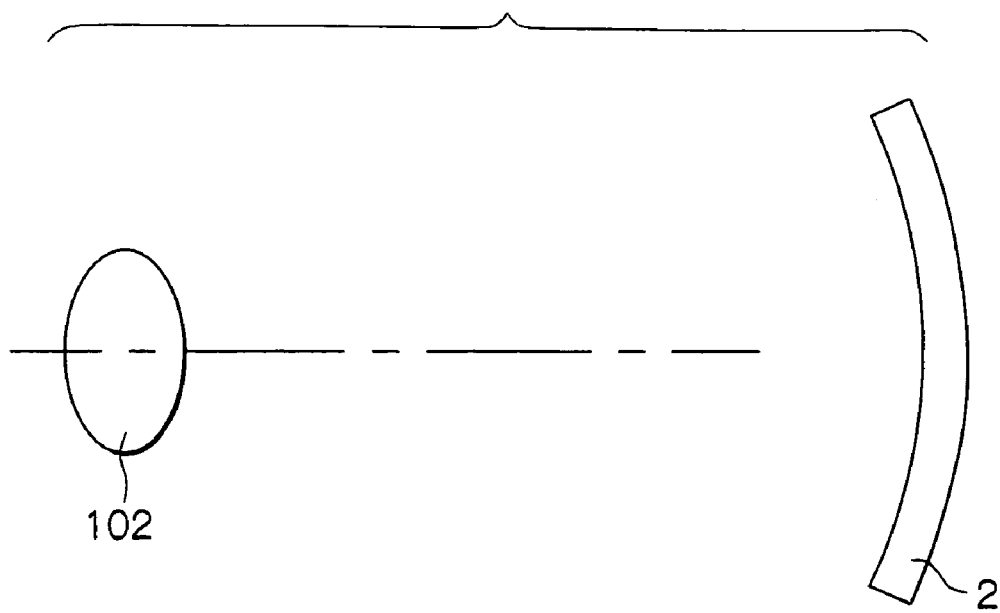
FIGS. 32A and 32B are a side view showing a focal plane and the curvature of CCD.

As described above, the shading or the distortion can be prevented from generating by forming CCD 2 in the shape along the imaging surface imaged by the lens 102 as shown in FIG. 32A.

Figure 32B:
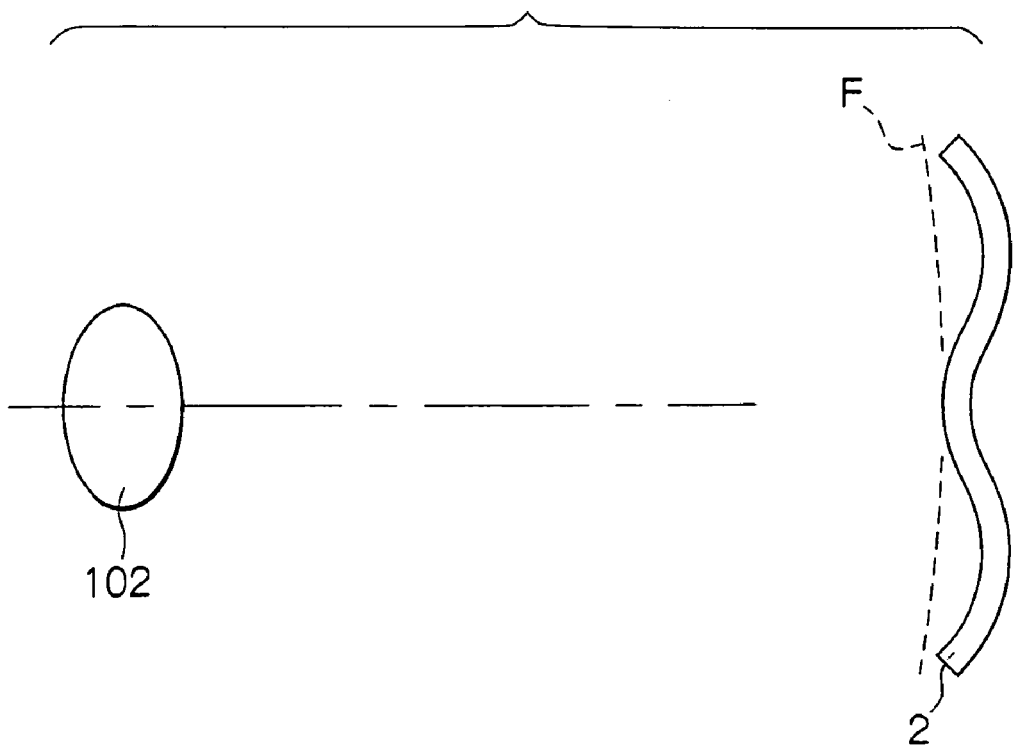

As shown in FIG. 32B, the shape of CCD 2 is not along an imaging surface F of the lens 102, but the shape of CCD 2 is curved so that the individual shape is formed.

In FIG. 32B, because only the center of an image plane of CCD 2 and the peripheral portion of the image plane are intersected with the focal plane, ring-shaped defocusing is generated in the periphery of the center of the image screen, and the so-called center focus shooting effect in which the subject in the center of the image screen is emphasized is obtained. Further, various applications such that a soft focus effect is obtained by offsetting the center of the image plane from the focal plane F can be applied.

Seventh Embodiment

Another example used for the digital camera 100 and the camera-equipped cellular phone 200 will be described below.

Figure 33:
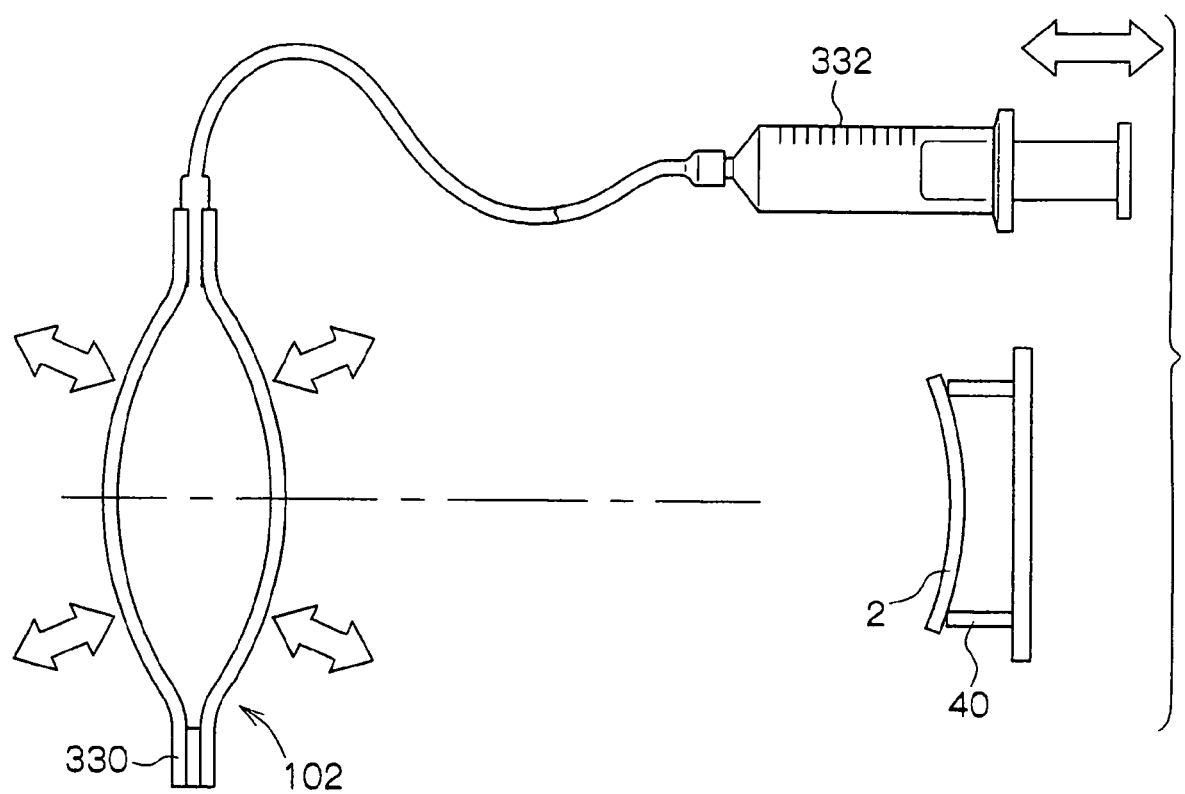
FIG. 33 is a sectional view showing the structure of the lens.

As shown in FIG. 33, a liquid or a gas having a refractive index different from that of the air is sealed in the lens 102 formed by a lens film 330 made of an optically transparent, soft material and the inside of the lens 102 is connected to a cylinder 332.

When the cylinder 332 is moved in the direction of an arrow, the liquid or the gas which enters and goes out from the inside of the lens 102 expands and compresses the lens film 330 to change the focal distance of the lens 102. The effect such as the improvement of the image quality can be obtained by changing the curvature of CCD 2 with the change of the focal distance as shown in FIGS. 22A to 22C.

As a way to link the change in the curvature of the CCD 2 with the change in the focal distance of the lens 102, it is possible to activate the cylinder 332 and the actuator 40 simultaneously by linking them mechanically or electrically.

Eighth Embodiment

Another example used for the digital camera 100 and the camera-equipped cellular phone 200 will be described below.

Figure 34:
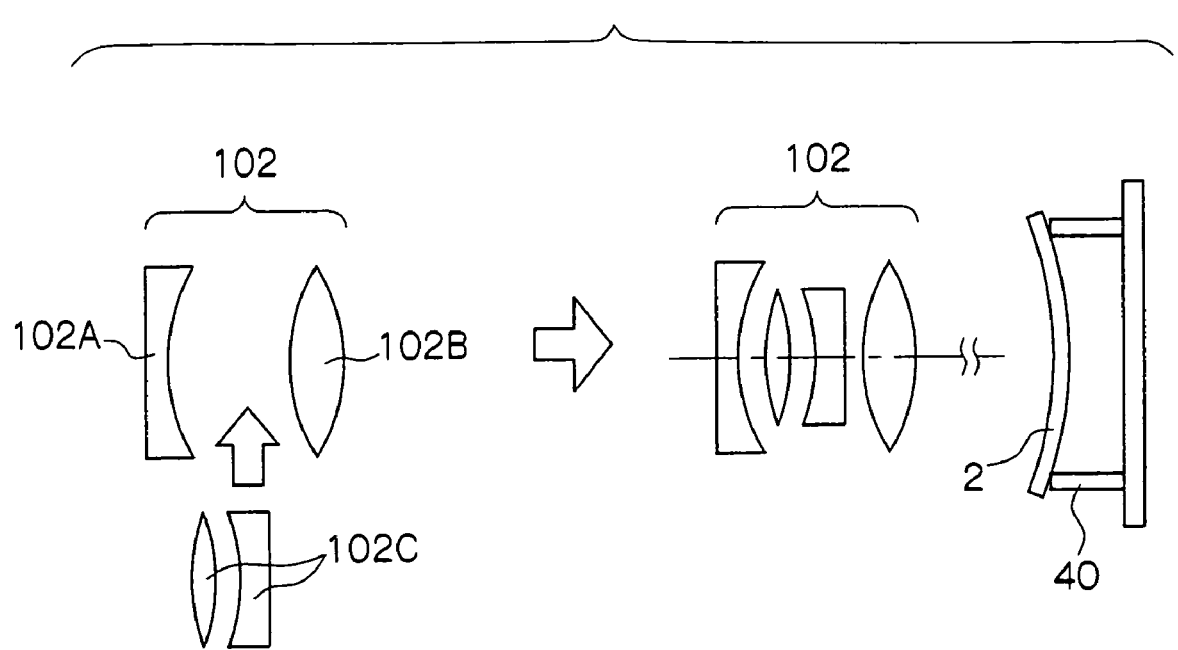
FIG. 34 is a side view showing the configuration and the movement of an element.

As shown in FIG. 34, an element 102C is arranged near the lens 102 including elements 102A and 102B, and the lens configuration has a structure in which the element 102C can be inserted into and retracted from the optical path of the lens 102 by the mechanism such as a turret method or a slide method.

Therefore, the so-called two-focal point camera in which the focal distance of the lens 102 is changed in two steps can be obtained. The effect such as the improvement of the image quality can be obtained by changing the curvature of CCD 2 with the change of the focal distance as shown in FIGS. 22A to 22C.

Also in this embodiment, as a way to link the change in the curvature of the CCD 2 with the change in the focal distance of the lens 102, it is possible to activate the element 102C and the actuator 40 simultaneously by linking them mechanically or electrically.

Further, changing the curvature of CCD 2 along with the change in the focal distance of the lens 102 as shown in FIGS. 22A to 22C may be conducted simultaneously with or after the changing of the focal distance of the lens 102.

Twelfth Embodiment

Another example used for the digital camera 100 and the camera-equipped cellular phone 200 will be described below.

Figure 35:
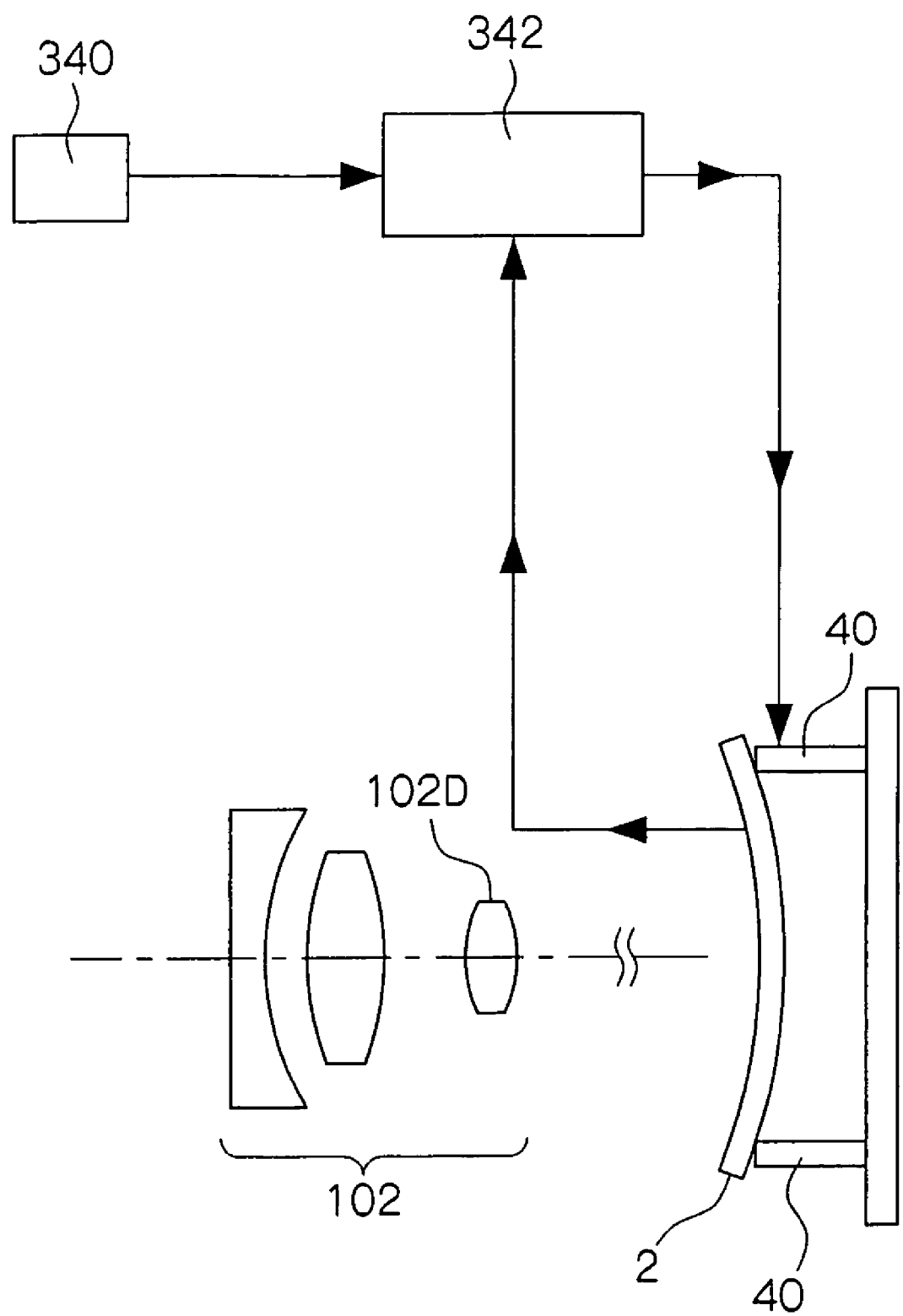
FIG. 35 is a block diagram showing the structure of a lens and detection of photographing distance.

As shown in FIG. 35, in the digital camera 100 in which a distance to a subject is measured by an AF sensor 340 and focusing is carried out in accordance with obtained distance information, the curvature of CCD 2 may be adjusted in accordance with the distance information obtained by the AF sensor 340.

That is, ranging is carried out by the AF sensor 340, such as, for example, a phase difference detecting system or an ultrasonic or infrared system, which is installed separately from the photographing optical system, and obtained distance information is sent to a control unit 342. The distance to the subject is determined by the control unit 342 from the received distance information, and, in a case where image quality is given priority, because the image surface curvature becomes larger if the distance is short, and because it is preferable to increase the curvature of CCD 2 to match this, the actuator 40 is controlled to increase the curvature of CCD 2 if the distance is short. Because the image surface curvature becomes smaller if the distance is far, and because it is preferable to decrease the curvature of CCD 2 to match this, the actuator 40 is controlled to decrease the curvature of CCD 2 if the distance is long.

Further, control may be carried out for intentionally changing the image surface shape and the curvature of CCD 2 or the like for a purpose such as trying to achieve a soft focus effect rather than improving image quality.

Moreover, instead of carrying out ranging by the AF sensor 340, ranging may be carried out by carrying out contrast detection in CCD 2. In this case, the distance information is calculated from position information of the photographing lens 102 or the focusing lens 102 or the like. Alternatively, contrast detection in the AF sensor 340 and in CCD 2 may be used together to carry out even higher speed AF control.

Thirteenth Embodiment

Another example used for the digital camera 100 and the camera-equipped cellular phone 200 will be described below.

Figure 36:
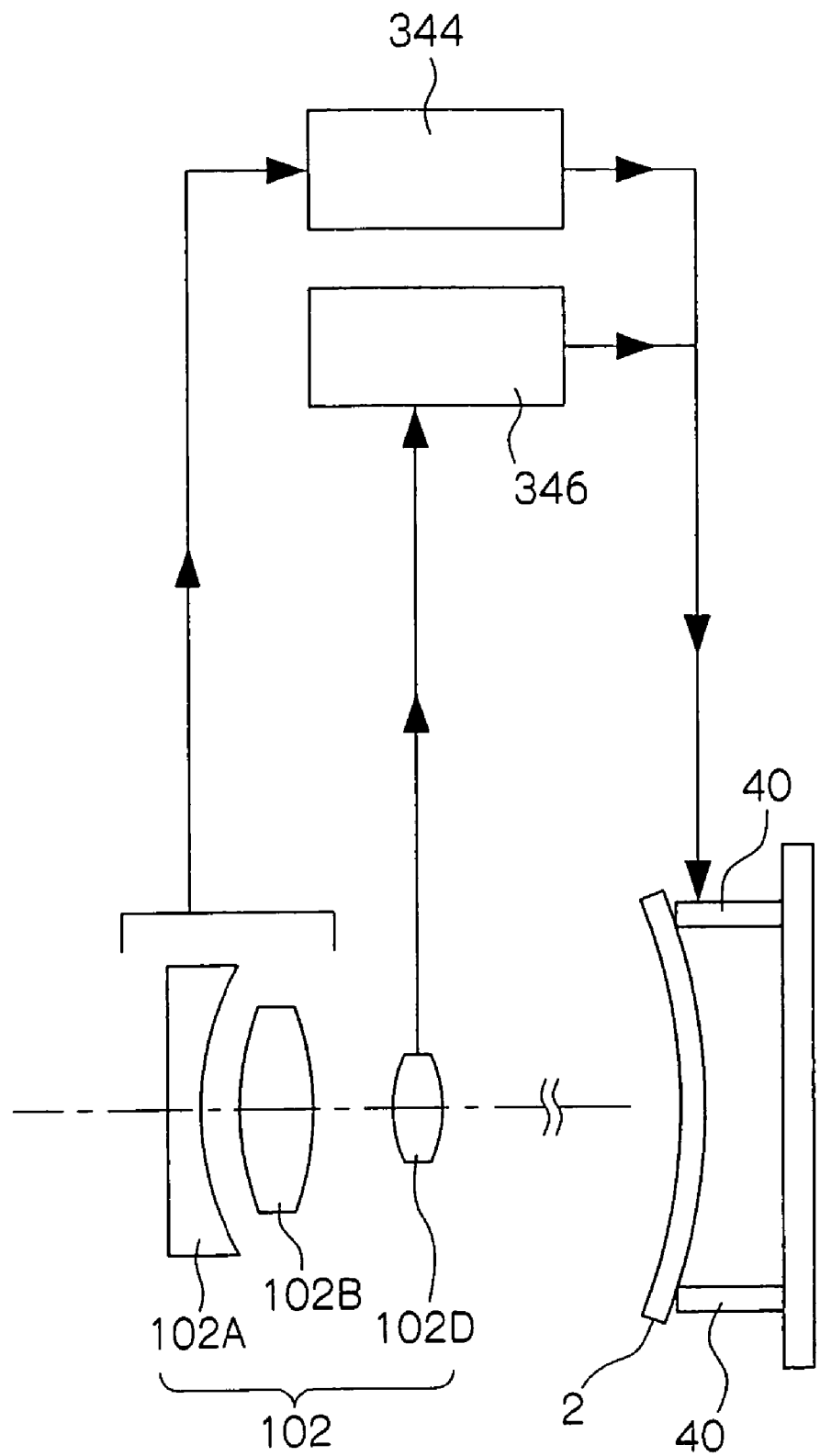
FIG. 36 is a block diagram showing the structure of a lens and detection of zoom position and photographing distance.

As shown in FIG. 36, in the digital camera 100 in which photographing is carried out using a zoom lens (front group 102A, back group 102B) and a focusing lens 102D, a focal distance of the photographing lens 102 is changed by the positional relationship of the front group 102A and the back group 102B, and the curvature of CCD 2 is changed in accordance with both this change in the focal distance and distance information, of the distance to the subject, obtained by carrying out focusing by movement of the focusing lens 102D.

In other words, the positions of the front group 102A and the back group 102B constituting the zoom lens are detected using a pulse count of a driving motor and an unillustrated position sensor provided at an interior of a lens barrel and are transmitted to a first control unit 344 as focal distance information.

Next, contrast detection on CCD 2 is carried out by movement of the focusing lens 102D to perform focusing, and a position of the focusing lens 102D is detected, in a similar manner as for the zoom position, using the pulse count of the driving motor and the unillustrated position sensor provided at the interior of the lens barrel and is transmitted to a second control unit 346 as focal distance information.

The first control unit 344 and the second control unit 346 send signals to the acutuator 40, in this order, to control the curvature of CCD 2. As a result, a curvature of CCD 2 that is optimal for both the focal distance and the focus position of the photographing lens 102 can be set.

Further, regarding the detection of the focus position, distance information from the external AF sensor 340 may be used as a basis as in the twelfth embodiment, and regarding the curvature of CCD 2, control may be carried out for intentionally changing the image surface shape and the curvature of CCD 2 or the like for a purpose such as trying to achieve a soft focus effect. In this case, since the depth of field is deep if the focal distance is short, control may be carried out so as to displace the image surface shape and the curvature of CCD 2 even more widely, or the like.

What is claimed is:

1. An optical instrument comprising:
a lens unit which has a plurality of lenses;
a solid-state image pickup element which is curved in a concave shape toward the lens unit and picks up an image focused by the lens unit; and
a curvature changing portion comprising a moving member which is in direct physical contact with the solid-state image pickup element and is movable in a first direction that crosses a second direction in which light is incident on the solid-state image pickup element to change a curvature of the solid-state image pickup element,
wherein switching between at least a telephoto mode for shooting a distant subject and a wide-angle mode for shooting a wide range can be carried out, and the curvature of the solid-state image pickup element is changed by the curvature changing portion so that the solid-state image pickup element is curved at a first curvature in the telephoto mode and the solid-state image pickup element is curved at a second curvature that is larger than the first curvature in the wide-angle mode.

2. An optical instrument according to claim 1, wherein the curvature of the solid-state image pickup element is changed so that the solid-state image pickup element is curved at a third curvature that is larger than the second curvature in a close-in mode for shooting a nearby subject.

3. The optical instrument according to claim 1, wherein the first direction crosses the second direction perpendicularly.

4. An optical instrument comprising:
a lens unit which includes at least two groups of lenses;
a solid-state image pickup element which is curved in a concave shape toward the lens unit and picks up an image focused by the lens unit;
a curvature changing portion comprising a moving member which is in direct physical contact with the image pickup element and is movable in a first direction that crosses a second direction in which light is incident on the solid-state image pickup element to change a curvature of the solid-state image pickup element; and
a zoom unit which zooms the lens unit by changing a distance between at least two groups of lenses among the groups of lenses,
wherein the curvature of the solid-state image pickup element is changed by the curvature changing portion together with the change in distance between the groups of lenses in the zoom unit.

5. An optical instrument according to claim 4, wherein each group of lenses is formed by one lens or a plurality of lenses.

6. The optical instrument according to claim 4, wherein the first direction crosses the second direction perpendicularly.

7. An optical instrument comprising:
a lens unit which includes at least two groups of lenses;
a solid-state image pickup element which is curved in a convex or concave shape toward the lens unit and picks up an image focused by the lens unit;
a curvature changing portion comprising a moving member which is in direct physical contact with the image pickup element and is movable in a first direction that crosses a second direction in which light is incident on the solid-state image pickup element to change a curvature of the solid-state image pickup element; and a zoom unit which zooms the lens unit by changing a distance between at least two groups of lenses among the groups of lenses, wherein the curvature of the solid-state image pickup element is changed by the curvature changing portion together with the change in distance between the groups of lenses by the zoom unit.

8. The optical instrument according to claim 7, wherein the first direction crosses the second direction perpendicularly.

9. An optical instrument comprising:

a photographing lens unit whose focal distance can be changed;

a solid-state image pickup element which picks up an image focused by the lens unit, and a curvature changing portion comprising a moving member which is in direct physical contact with the image pickup element and is movable in a first direction that crosses a second direction in which light is incident on the solid-state image pickup element to change a curvature of the solid-state image pickup element, wherein the curvature of the solid-state image pickup element is changed by the curvature changing portion to form a concave cubic surface when viewed from the lens unit, in conjunction with the changing of the focal distance of the lens unit.

10. The optical instrument according to claim 9, wherein the first direction crosses the second direction perpendicularly.

11. An optical instrument comprising:

a photographing lens unit;

a solid-state image pickup element which is curved in a light incident direction, and a curvature changing portion comprising a moving member which is in direct physical contact with the image pickup element and is movable in a first direction that crosses the light incident direction to change a curvature of the solid-state image pickup element, wherein a light receiving surface of the solid-state image pickup element does not correspond to an imaging surface of the photographing lens unit.

12. The optical instrument according to claim 11, wherein the first direction crosses the second direction perpendicularly.

13. An optical instrument comprising:

a photographing lens unit whose focal distance can be changed by changing a shape thereof;

a solid-state image pickup element which picks up an image focused by the lens unit, and a curvature changing portion comprising a moving member which is in direct physical contact with the image pickup element and is movable in a first direction that crosses a second direction in which light is incident on the solid-state image pickup element to change a curvature of the solid-state image pickup element, wherein the curvature of the solid-state image pickup element is changed by the curvature changing portion to form in conjunction with a change in focal distance of the lens unit.

14. The optical instrument according to claim 13, wherein the first direction crosses the second direction perpendicularly.

15. An optical instrument comprising:

a photographing lens unit which includes a plurality of groups of lenses and whose focal distance can be changed, a part of the groups of lenses being capable to be inserted into an optical path and removed from the optical path;

a solid-state image pickup element which is curved in a light incident direction; and a curvature changing portion comprising a moving member which is in direct physical contact with the image pickup element and is movable in a first direction that crosses the light incident direction to change a curvature of the solid-state image pickup element.

16. An optical instrument according to claim 15, wherein the curvature of the solid-state image pickup element is changed in conjunction with the changing of the focal distance of the lens unit.

17. The optical instrument according to claim 15, wherein the first direction crosses the second direction perpendicularly.

18. An optical instrument comprising:

a photographing lens comprising a plurality of groups of lenses including at least a variable-power lens group and a focus adjusting lens group; and an adjusting portion comprising a moving member which is in direct physical contact with the image pickup element and is movable in a first direction that crosses a second direction in which light is incident on the solid-state image pickup element to change a curvature of a solid-state image pickup element in the light incident direction, along with changing of a focal distance of the photographing lens by the variable-power lens group.

19. The optical instrument according to claim 18, wherein the first direction crosses the second direction perpendicularly.

20. An optical instrument comprising:

a photographing lens comprising a plurality of groups of lenses including at least a variable-power lens group and a focus adjusting lens group; and an adjusting portion comprising a moving member which is in direct physical contact with the image pickup element and is movable in a first direction that crosses a second direction in which light is incident on the solid-state image pickup element to change a curvature of a solid-state image pickup element in the light incident direction, along with focus adjustment by the focus adjusting lens group.

21. An optical instrument according to claim 20, further comprising:

a detecting portion which detects a distance to a subject; and a second adjusting portion which changes the curvature of the solid-state image pickup element in accordance with the distance to the subject detected by the detecting portion.

22. An optical instrument according to claim 21, wherein the second adjusting portion increases the curvature of the solid-state image pickup element when the detecting portion detects that the subject is close and decreases the curvature of the solid-state pickup element when the detecting portion detects that the subject is far away.

23. The optical instrument according to claim 20, wherein the first direction crosses the second direction perpendicularly.

24. An optical instrument comprising:
a photographing lens comprising a plurality of groups of lenses including a focus adjusting lens group; and
an adjusting portion comprising a moving member which is in direct physical contact with the image pickup element and is movable in a first direction that crosses a second direction in which light is incident on the solid-state image pickup element to change a curvature of a solid-state image pickup element in the light incident direction, along with focus adjustment by the focus adjusting lens group.

25. An optical instrument according to claim 24, further comprising
a detecting portion which detects a distance to a subject; and
a second adjusting portion which changes the curvature of the solid-state image pickup element in accordance with the distance to the subject detected by the detecting portion.

26. An optical instrument according to claim 25, wherein the second adjusting portion increases the curvature of the solid-state image pickup element when the detecting portion detects that the subject is close and decreases the curvature of the solid-state pickup element when the detecting portion detects that the subject is far away.

27. The optical instrument according to claim 24, wherein the first direction crosses the second direction perpendicularly.

28. An optical instrument comprising:
a photographing lens comprising a plurality of groups of lenses including at least a variable-power lens group and a focus adjusting lens group; and
a curvature adjusting portion comprising a moving member which is in direct physical contact with the image pickup element and is movable in a first direction that crosses a second direction in which light is incident on the solid-state image pickup element to adjust a curvature of a solid-state image pickup element in the light incident direction.

29. The optical instrument according to claim 28, wherein the first direction crosses the second direction perpendicularly.

30. An optical instrument comprising:
a photographing lens comprising a plurality of groups of lenses including at least a focus adjusting lens group; and
a curvature adjusting portion comprising a moving member which is in direct physical contact with the image pickup element and is movable in a first direction that crosses a second direction in which light is incident on the solid-state image pickup element to adjust a curvature of a solid-state image pickup element in the light incident direction.

31. The optical instrument according to claim 30, wherein the first direction crosses the second direction perpendicularly.

32. An optical instrument comprising:
a photographing lens comprising a plurality of groups of lenses including at least a variable-power lens group; and
a curvature adjusting portion comprising a moving member which is in direct physical contact with the image pickup element and is movable in a first direction that crosses a second direction in which light is incident on the solid-state image pickup element to adjust a curvature of a solid-state image pickup element in the light incident direction.

33. The optical instrument according to claim 32, wherein the first direction crosses the second direction perpendicularly.

* * * * *